United States Patent
Giese

(10) Patent No.: US 8,499,877 B1
(45) Date of Patent: Aug. 6, 2013

(54) SUSPENSION ARCHITECTURE FOR A SNOWMOBILE

(71) Applicant: Polaris Industries Inc., Medina, MN (US)

(72) Inventor: Timothy J. Giese, White Bear Township, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 13/685,124

(22) Filed: Nov. 26, 2012

Related U.S. Application Data

(60) Continuation of application No. 13/440,746, filed on Apr. 5, 2012, now abandoned, which is a division of application No. 12/968,749, filed on Dec. 15, 2010, now Pat. No. 8,151,923, which is a division of application No. 11/709,421, filed on Feb. 22, 2007, now Pat. No. 7,854,285.

(60) Provisional application No. 60/775,997, filed on Feb. 24, 2006.

(51) Int. Cl.
*B62M 29/00* (2006.01)

(52) U.S. Cl.
USPC .............................. 180/193; 180/190; 180/191

(58) Field of Classification Search
USPC .......................................... 180/193, 190, 191
See application file for complete search history.

(56) References Cited

U.S. PATENT DOCUMENTS

| | | | |
|---|---|---|---|
| 3,613,811 | A | 10/1971 | Brandli et al. |
| 3,721,308 | A | 3/1973 | Brandli et al. |
| 4,093,033 | A | 6/1978 | Rosch |
| 4,826,260 | A | 5/1989 | Plourde |
| 5,370,198 | A | 12/1994 | Karpik |
| 5,667,031 | A | 9/1997 | Karpik |
| 5,692,579 | A | 12/1997 | Peppel et al. |
| 5,860,486 | A | 1/1999 | Boivin et al. |
| 5,904,216 | A | 5/1999 | Furusawa |
| 5,944,134 | A | 8/1999 | Peppel et al. |
| 6,206,124 | B1 | 3/2001 | Mallette et al. |
| 6,283,241 | B1 | 9/2001 | Kubota |
| 6,390,219 | B1 | 5/2002 | Vaisanen |
| 6,450,279 | B1 | 9/2002 | Imamura |
| 6,467,561 | B1 | 10/2002 | Boivin et al. |
| 6,478,098 | B2 | 11/2002 | Boivin et al. |
| 6,631,778 | B2 | 10/2003 | Mallette |
| 6,976,689 | B2 | 12/2005 | Hibbert |
| 7,070,012 | B2 | 7/2006 | Fecteau |
| 7,360,618 | B2 | 4/2008 | Hibbert |
| 7,395,890 | B2 | 7/2008 | Visscher |
| 7,523,799 | B2 | 4/2009 | Yoshihara |
| 7,854,285 | B1 | 12/2010 | Giese |
| 8,151,923 | B1 | 4/2012 | Giese |
| 2002/0093168 | A1 | 7/2002 | Hibbert |
| 2005/0016784 | A1 | 1/2005 | Fecteau |
| 2006/0169510 | A1 | 8/2006 | Visscher |
| 2006/0185919 | A1 | 8/2006 | Hibbert et al. |
| 2007/0175686 | A1 | 8/2007 | Yoshihara |

OTHER PUBLICATIONS

Action Closing Prosecution in Reexam 95/002,010, Jan. 25, 2013, 24 pgs.

(Continued)

*Primary Examiner* — Kevin Hurley
*Assistant Examiner* — Michael Stabley
(74) *Attorney, Agent, or Firm* — Faegre Baker Daniels LLP

(57) ABSTRACT

A rear suspension architecture is provided for coupled rear suspension systems.

30 Claims, 29 Drawing Sheets

OTHER PUBLICATIONS

Action Closing Prosecution in Reexam 95/002,011, Jan. 25, 2013, 28 pgs.
"Yamaha's 'Mono Shock RA' Rear Suspension: The True Development Story", SnowTech Magazine, Oct./Nov. 2004 Issue, pp. 94-97 (Nov. 15, 2004).
2004 Ski-Doo® Shop Manual, Rev Series, Bombardier Recreational Products, published 2003, Quebec, Canada, (2003) 436 pgs.
Yamaha® RX-1 Mountain/ER Warrior 2005 Service Manual, LIT-12618-RX-00, Yamaha Motor Corporation, U.S.A., Apr. 2004, 524 pgs.
Definition of "Bellcrank", from Wikipedia, http://en.wikipedia.org/wiki/bellcrank, printed May 17, 2012, 1 pg.
SkiDoo® New Technical Features, Technology 2003, Club Bombardier, dated Jan. 2, 2002, 28 pgs.
2005 Tundra Shop Manual, Bombardier Recreational Products, published 2004, Quebec, Canada, (2004) 606 pgs.
BRP, Inc., Inter Partes Request for Reexamination, Reexam No. 95/002,010, Jun. 5, 2012, 174 pgs.
Non-Final Office Action, Reexam No. 95/002,010, Jul. 6, 2012, 16 pgs.
Order Granting/Denying Request for Inter Partes Reexamination, Reexam No. 95/002,010, Jul. 6, 2012, 31 pgs.
Patent Owner's Response to Office Action Dated Jul. 6, 2012, Reexam No. 95/002,010, Oct. 3, 2012, 34 pgs.
Requesters Comments in Response to Shortened Patent Owners Response to the Office Action Dated Jul. 6, 2012, Reexam No. 95/002,010, Oct. 31, 2012, 36 pgs.
BRP, Inc., Inter Partes Request for Reexamination, Reexam No. 95/002,011, Jun. 5, 2012, 496 pgs.
Non-Final Office Action, Reexam No. 95/002,011, Jul. 30, 2012, 19 pgs.
Order Granting/Denying Request for Inter Partes Reexamination, Reexam No. 95/002,011, Jul. 30, 2012, 34 pgs.
Patent Owner's Response to Office Action Dated Jul. 30, 2012, Reexam No. 95/002,011, Oct. 1, 2012, 60 pgs.
Requester's Comments in Response to Patent Owner's Response to the Office Action Dated Jul. 30, 2012, Reexam No. 95/002,011, Oct. 31, 2012, 38 pgs.
Fecteau, U.S. Appl. No. 60/488,437, Jul. 21, 2003, 38 pgs.
Declaration of Bertrand Mallette in Support of Inter Partes Request for Reexamination of U.S. Patent No. 7,854,285, Reexam No. 95/002,010, May 29, 2012, 13 pgs.
Second Declaration of Bertrand Mallette in Support of Requester's Comments in Response to Shortened Patent Owner's Response to the Office Action Dated Jul. 6, 2012, Reexam No. 95/002,010, Oct. 31, 2012, 12 pgs.
Declaration of Michael L. Fugleberg in Support of Patent Owner's Response to Office Action of Jul. 6, 2012, Reexam No. 95/002,010, Oct. 3, 2012, 16 pgs.
Declaration of Bertrand Mallette in Support of Inter Partes Request for Reexamination of U.S. Patent No. 8,151,923, Reexam No. 95/002,011, Jun. 4, 2012, 15 pgs.
Second Declaration of Bertrand Mallette in Support of Requester's Comments in Response to Shortened Patent Owner's Response to the Office Action Dated Jul. 6, 2012, Reexam No. 95/002,011, Oct. 31, 2012, 11 pgs.
Declaration of Michael L. Fugleberg in Support of Patent Owner's Response to Office Action of Jul. 30, 2012, Reexam No. 95/002,011, Oct. 1, 2012, 9 pgs.
Decision on Petition Under 37 CFR 1.181, Reexamination No. 95/002,010, Apr. 16, 2013, 6 pgs.
Patent Owner's Response to ACP Dated Jan. 25, 2013, Reexam No. 95/002,011, Feb. 25, 2013, 59 pgs.
Exhibit A, Second Declaration of Michael L. Fugleberg in Support of Patent Owner's Response to ACP Dated Jan. 25, 2013, Reexam No. 95/002,011, Feb. 25, 2013, 8 pgs.
Exhibit B, Declaration of Christopher Wolf in Support of Patent Owner's Response to ACP Dated Jan. 25, 2013, Reexam No. 95/002,011, Feb. 20, 2013, 57 pgs.
Petition to Withdraw Jan. 25, 2013 ACP, Reexam No. 95/002,011, Feb. 25, 2013, 7 pgs.
Patent Owner's Response to ACP Dated Jan. 25, 2013, Reexam No. 95/002,010, Feb. 25, 2013, 38 pgs.
Exhibit A, Claim Listing filed with Patent Owner's Response to ACP Dated Jan. 25, 2013, Reexam No. 95/002,010, Feb. 25, 2013, 9 pgs.
Exhibit B, Second Declaration of Michael L. Fugleberg in Support of Patent Owner's Response to ACP Dated Jan. 25, 2013, Reexam No. 95/002,010, Feb. 25, 2013, 4 pgs.
Exhibit C, Declaration of Christopher Wolf in Support of Patent Owner's Response to ACP Dated Jan. 25, 2013, Reexam No. 95/002,010, Feb. 20, 2013, 57 pgs.
Petition to Withdraw Jan. 25, 2013 ACP, Reexam No. 95/002,010, Feb. 25, 2013, 7 pgs.
Requester's Comments in response to Patent Owner's Response to ACP Dated Jan. 25, 2013, Reexam No. 95/002,010, Mar. 27, 2013, 35 pgs.
Third Declaration of Bertrand Mallette in Support of Requester's Comments in response to Patent Owner's Response to ACP Dated Jan. 25, 2013, Reexam No. 95/002,010, Mar. 26, 2013, 12 pgs.
Requester's Comments in response to Patent Owner's Response to ACP Dated Jan. 25, 2013, Reexam No. 95/002,011, Mar. 27, 2013, 37 pgs.
Third Declaration of Bertrand Mallette in Support of Requester's Comments in response to Patent Owner's Response to ACP Dated Jan. 25, 2013, Reexam No. 95/002,011, Mar. 26, 2013, 12 pgs.
Decision on Petition under 37 CFR 1.181, Reexam No. 95/002,011, Mar. 19, 2013, 5 pgs.
Right of Appeal Notice dated May 1, 2013, Reexam No. 95/002,010, May 1, 2013, 31 pgs.
Right of Appeal Notice dated May 1, 2013, Reexam No. 95/002,011, May 1, 2013, 37 pgs.

SUSPENSION ARCHITECTURE FOR A SNOWMOBILE

CROSS REFERENCE TO RELATED APPLICATIONS

This application is a continuation of U.S. patent application Ser. No. 13/440,746, filed Apr. 5, 2012; which is a divisional of U.S. patent application Ser. No. 12/968,749, now U.S. Pat. No. 8,151,923, filed Dec. 15, 2010; which is a divisional of U.S. patent application Ser. No. 11/709,421, now U.S. Pat. No. 7,854,285, filed on Feb. 22, 2007; which claims the benefit of U.S. Provisional Application Ser. No. 60/775,997 filed Feb. 24, 2006, the disclosures of which are fully incorporated herein by reference.

FIELD OF THE INVENTION

The invention relates generally to the architecture for a snowmobile suspension system.

BACKGROUND AND SUMMARY

Most snowmobiles include a chassis, an engine, a transmission, and endless belt assembly designed to contact the ground and propel the snowmobile. Typical snowmobiles also include a pair of front skis support by a front suspension system. The endless belt assembly generally includes a rear suspension system designed to help the belt assembly maintain contact with the ground when riding over uneven terrain and provide the rider with a comfortable ride.

Generally, there are two types of snowmobile rear suspensions in the snowmobile industry: coupled and uncoupled. The term "coupled" is generally given to suspensions that have dependant kinematics front-to-rear and/or rear-to-front relative to the lower rails of the rear suspension. A suspension is coupled rear-to-front when the front portion of the lower rails is deflected vertically and the rear portion of the lower rails is forced to move vertically to some degree. A suspension is coupled rear-to-front when the rear portion of the lower rails is deflected vertically and the front portion of the lower rails is forced to move vertically to some degree. An uncoupled rear suspension is generally independent front-to-rear and rear-to-front relative to the lower rails of the rear suspension. A vertical deflection of the front portion of the suspension causes little to no vertical deflection of the rear portion of the suspension and vice versa.

Coupled suspensions differ from uncoupled suspension in at least two areas. There is a distinct stiffness or rate of deflection of the rear suspension per pound of force applied to the rear suspension for both the front and rear portion of the rear suspension. A coupled suspension combines the rates of both the front and rear portions of the rear suspension so the overall rate becomes higher than rate that may be achieved with an uncoupled rear suspension. Second, a coupled rear suspension may be used to control weight transfer to the rear suspension during acceleration of the snowmobile.

One embodiment of the present invention includes a snowmobile comprising a chassis, a motor supported by the chassis, and an endless belt assembly including a belt and a coupled suspension, the coupled suspension including a lower rail, a front and rear control arm, a first and second bump stop, and a coupling member positioned between the first and second bump stops, the front control arm adapted to operably connect the lower rail to the chassis, the rear control arm adapted to operably connect the coupling member to the chassis, the first bump stop supported by the lower rail at a first position, the second bump stop supported by the lower rail at a second position, the coupling member pivotally supported to the lower rail, the coupling member being moveable between the first bump stop and the second bump stop, the coupling member configured to exert a horizontal and vertical force on the second bump stop, the vertical force being greater than the horizontal force.

Another embodiment of the present invention includes a snowmobile having a coupled suspension, the snowmobile comprising a chassis having a front and rear end, a lower rail, a front control arm positioned adjacent to the chassis front end, the front control arm pivotally interconnecting the chassis and the lower rail, a rear inverted control link interconnected to the lower rail, a rear control arm positioned adjacent to the chassis rear end and pivotally interconnected to the chassis and the rear inverted control link, the rear control arm interconnected to the rear inverted control link at a position below the interconnection between the rear inverted control arm and the lower rail, and a coupling member providing a controlled degree of freedom of movement between the coupling member and the rear control arm, until coupling between the rear control arm and the lower rail occurs.

Another embodiment of the present invention includes a snowmobile comprising a chassis having a front and rear end, a lower rail, a front control arm defining a first length extending between first and second spaced-apart ends, the front control arm positioned adjacent to the chassis front end, the front control arm pivotally coupled to the chassis on the first end and pivotally coupled to the lower rail on the second end, a rear control arm positioned adjacent to the chassis rear end and pivotally interconnected to the chassis and lower rail, a linkage assembly supported by the front control arm at a first position between the first and second ends of the front control arm, the first position being spaced-apart from the second end of the front control arm by at least a first distance, the first distance being defined by one-quarter of the length of the front control arm, and a shock absorber and pull rod each including first and second spaced-apart ends, the first ends interconnected to the rear control arm, the second ends operably coupled to the linkage assembly.

Another embodiment of the present invention includes a snowmobile comprising a chassis having a front and rear end, a lower rail having front and rear ends, and an endless belt assembly including a belt, a front control arm, a rear control arm, a coupling member, and a belt tensioning system, the front control arm positioned adjacent to the chassis front end and adapted to pivotally interconnect the chassis and the lower rail, the rear control arm positioned adjacent to the chassis rear end and adapted to pivotally interconnect the chassis and one of the coupling member and the lower rail, the coupling member providing a controlled degree of freedom of movement between the coupling member and the rear control arm, the belt tensioning system configured to maintain an appropriate belt tension during movement between the chassis and lower rail.

In yet another embodiment, a snowmobile having a coupled suspension comprises a chassis, at least one lower rail, at least one front control arm pivotally coupled to the chassis at a first end and pivotally coupled to the lower rail on a second end, a rear control arm positioned adjacent to the chassis rear end and pivotally interconnected to the chassis and lower rail, a front linkage assembly supported by the front control arm, a rear linkage assembly supported by the rear control arm; a tension rod extending between the front and rear linkage, an LFE operatively connected between the front linkage assembly and the rear linkage assembly, and extending along a longitudinal line of action (LOA), where the LFE front pivot point and a front pivot point of the tension rod being substantially along the LOA, and being spaced apart from each other.

The above mentioned and other features of this invention, and the manner of attaining them, will become more apparent and the invention itself will be better understood by reference to the following description of embodiments of the invention taken in conjunction with the accompanying drawings.

Figure 1:
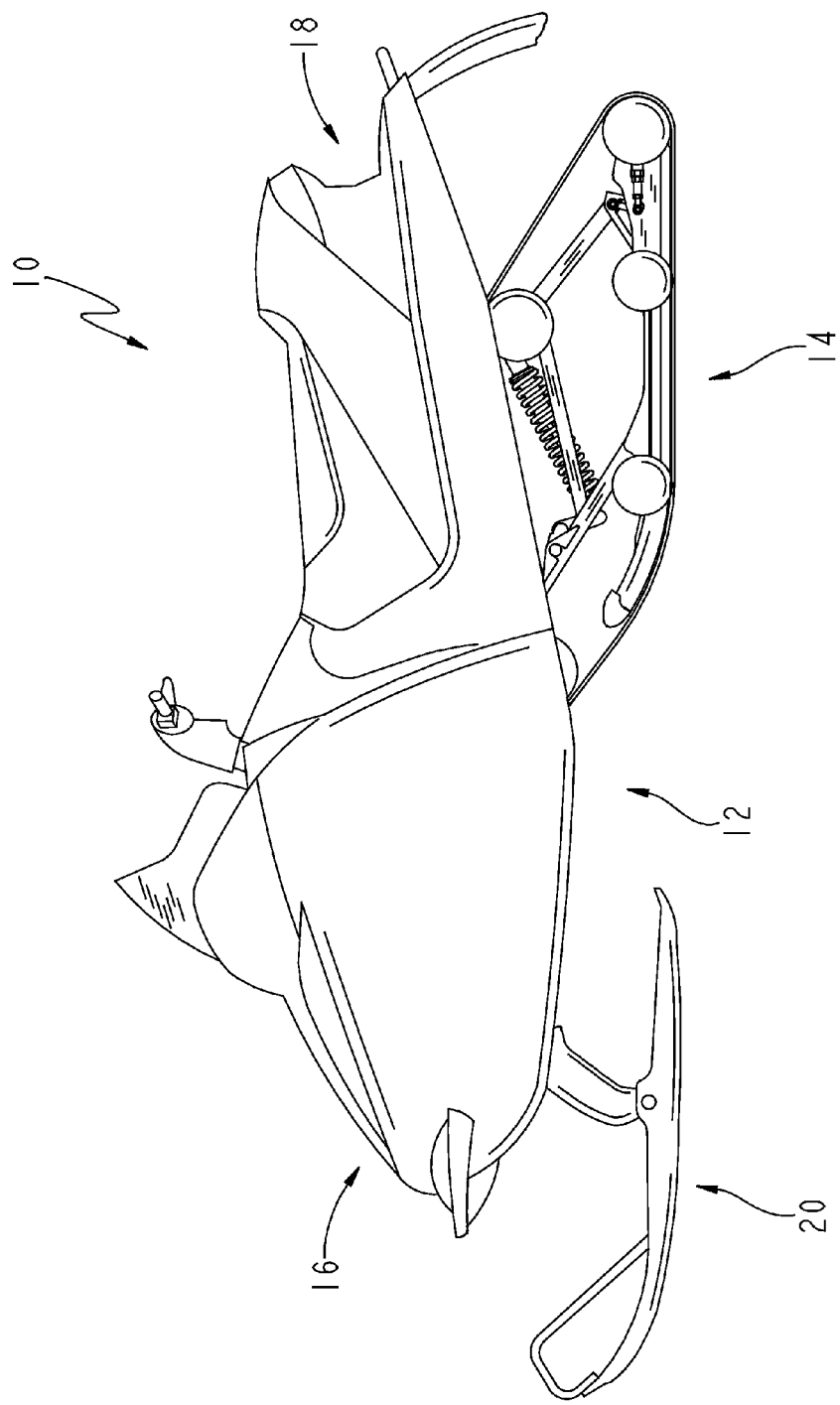
FIG. 1 is a profile view of one embodiment of a snowmobile.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to a rear suspension system for a snowmobile, it should be understood that the principles of the invention apply equally to other suspension systems. While the present invention primarily involves a snowmobile, it should be understood, however, that the invention may have application to other types of vehicles such as all-terrain vehicles, motorcycles, watercraft, utility vehicles, scooters, and mopeds.

Referring to FIG. 1, one embodiment of a snowmobile 10 is shown. Snowmobile 10 includes a chassis 12, an endless belt assembly 14, and a pair of front skis 20. Snowmobile 10 also includes a front-end 16 and a rear-end 18.\

Figure 2:
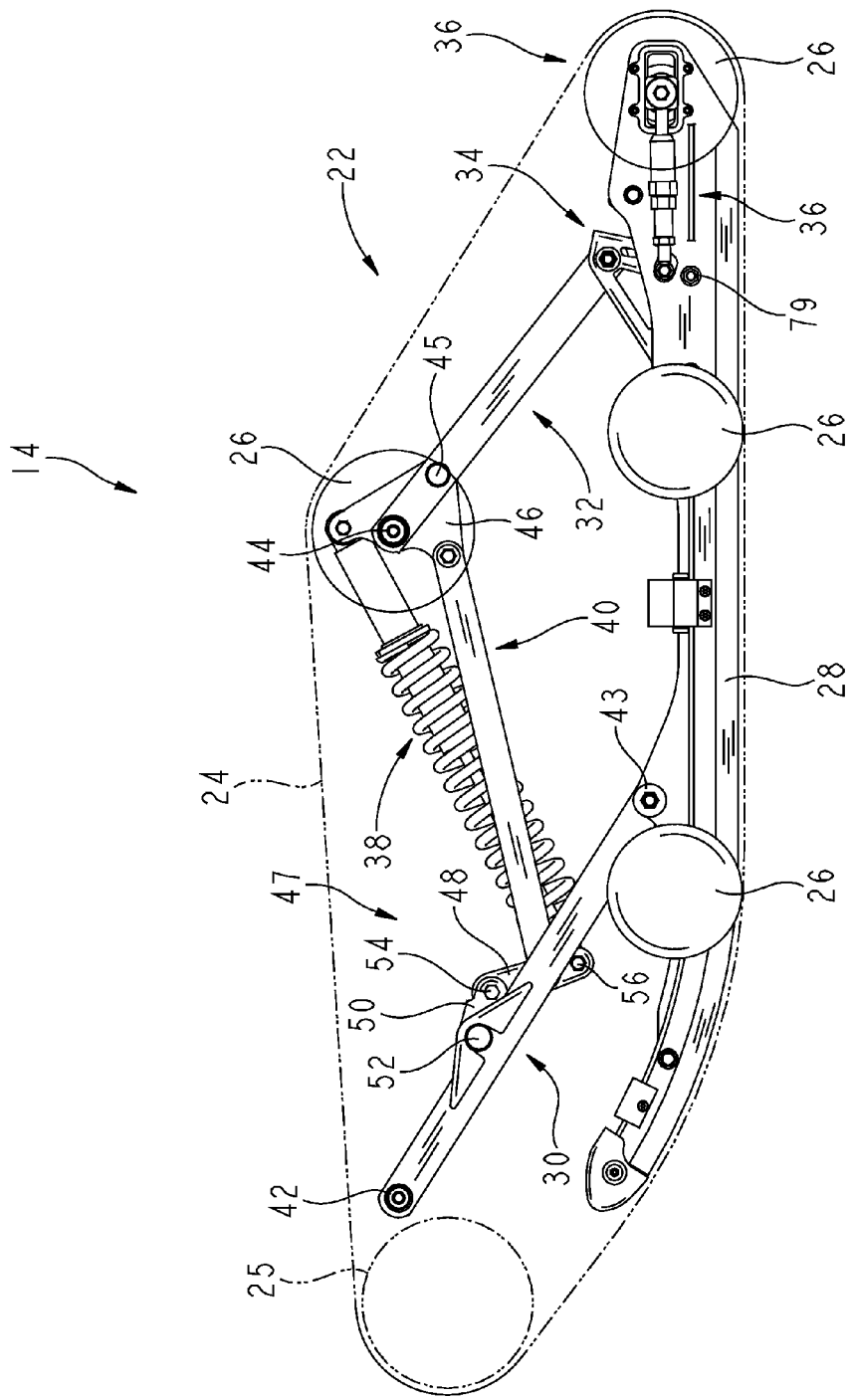
FIG. 2 is a profile view of the endless belt assembly of the snowmobile shown in FIG. 1.
Figure 3:
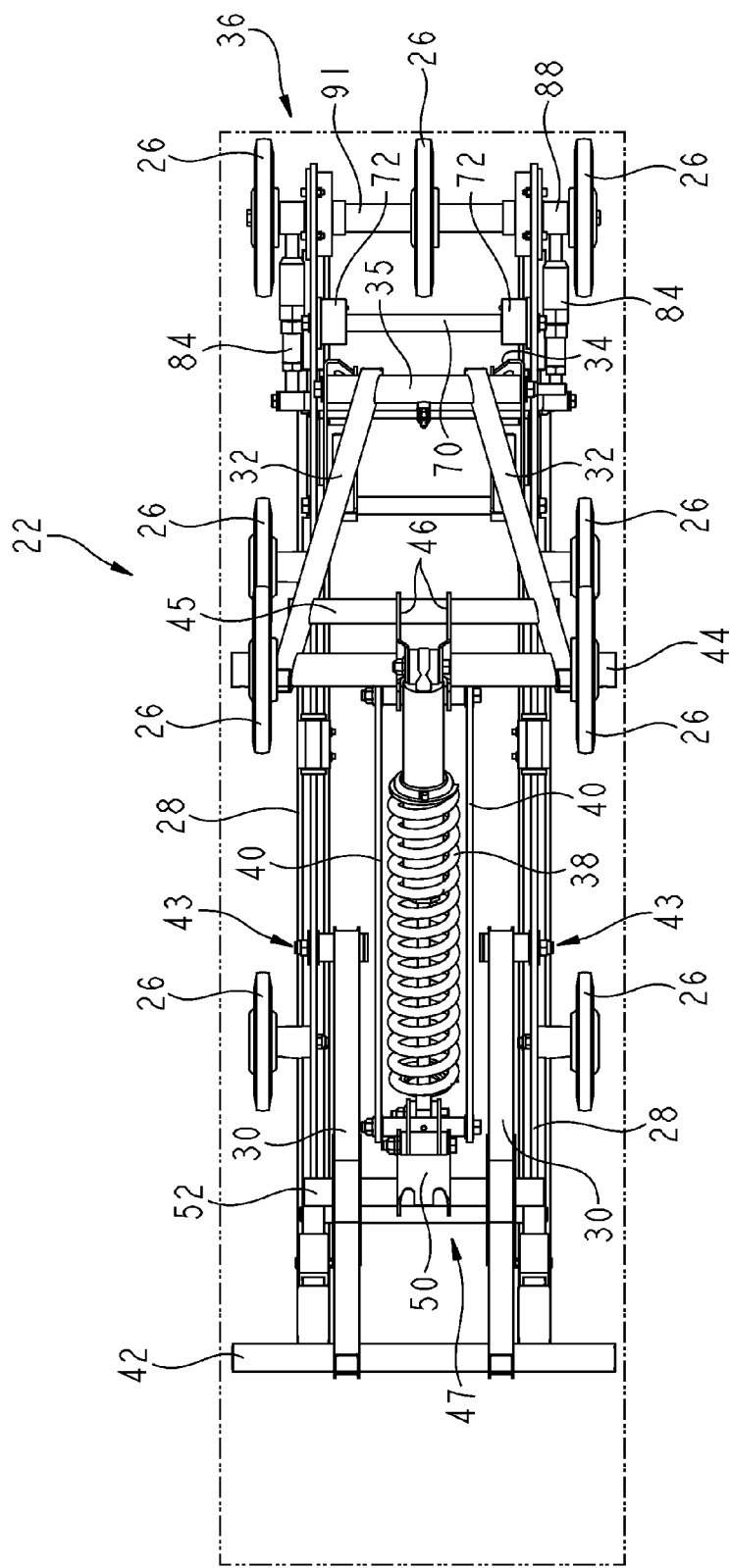
FIG. 3 is a top view of the coupled rear suspension system of the endless belt assembly shown in FIG. 2.
Figure 4:
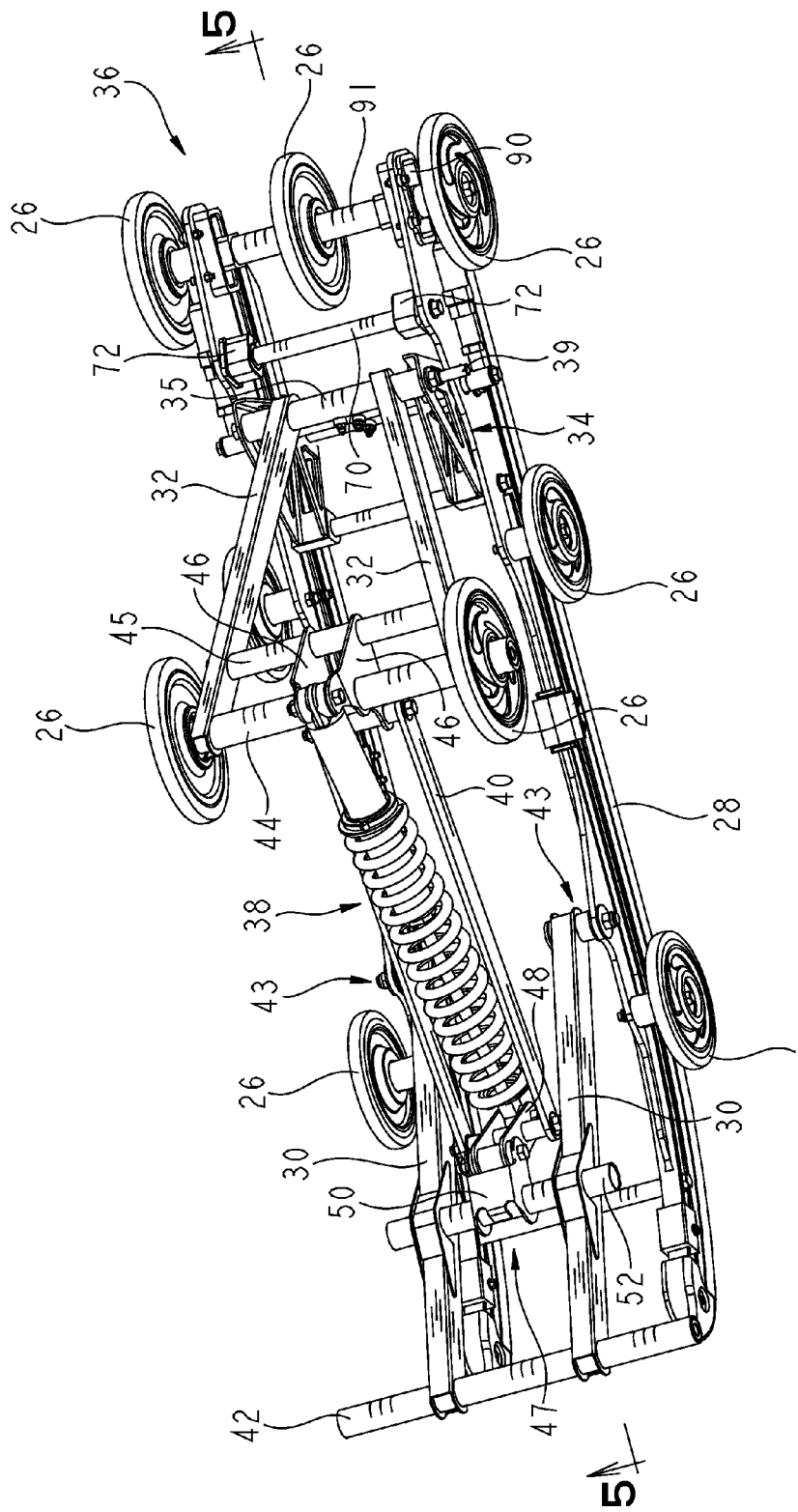
FIG. 4 is an elevated, perspective view of the coupled rear suspension system shown in FIG. 3.

Referring now to FIGS. 2-4, endless belt assembly 14 includes a coupled rear suspension system 22 and a belt 24. Belt 24 extends around powered roller 25 and idler rollers 26 which are mounted at various locations on suspension system 22. Roller 25 is powered by an engine (not shown) and transmission (not shown) of snowmobile 10. In operation roller 25 rotates about its central axis to move belt 24 around endless belt assembly 14 to propel snowmobile 10. Coupled rear suspension system 22 includes a pair of spaced-apart lower rails 28, a pair of front control arms 30, a pair of rear control arms 32, a coupling member 34, and a belt tensioning assembly 36. Front control arms 30 are coupled together on an upper end by cross shaft 42. Cross shaft 42 couples to chassis 12 of snowmobile 10. Similarly, rear control arms 32 are coupled together by cross shaft 44 which is coupled to chassis 12 of snowmobile 10. Together, chassis 12, front control arms 30, rear control arms 32, and lower rails 28 form a four-bar linkage. Front control arms 30 are pivotally coupled to lower rails 28 at pivot points 43. Rear links 32 are coupled on their lower end to cross shaft 35 (FIG. 4). Cross shaft 35 is pivotally coupled to coupling member 34 by fastener 39. Coupling member 34 is pivotally coupled to lower rails 28 by fastener 79 (FIG. 2). Coupling member 34 is described in more detail below.

Coupled suspension system 22 also includes a shock absorber 38 and pull rods 40 which are coupled between front control arms 30 and cross shaft 44. The upper end of shock absorber 38 and pull rods 40 is coupled to a pair of plates 46 which are coupled to cross shafts 44 and 45. Plates 46 are rigidly coupled to cross shafts 44 and 45 to interconnect shock absorber 38 and pulls rods 40 with rear control arms 32. The lower ends of shock absorber 38 and pull rods 40 are coupled to a linkage assembly 47 including link 48. Pull rods 40 accelerate the stroke of shock absorber 38 when coupled suspension system 22 is compressed. Link 42 behaves as a bell crank.

Figure 5:
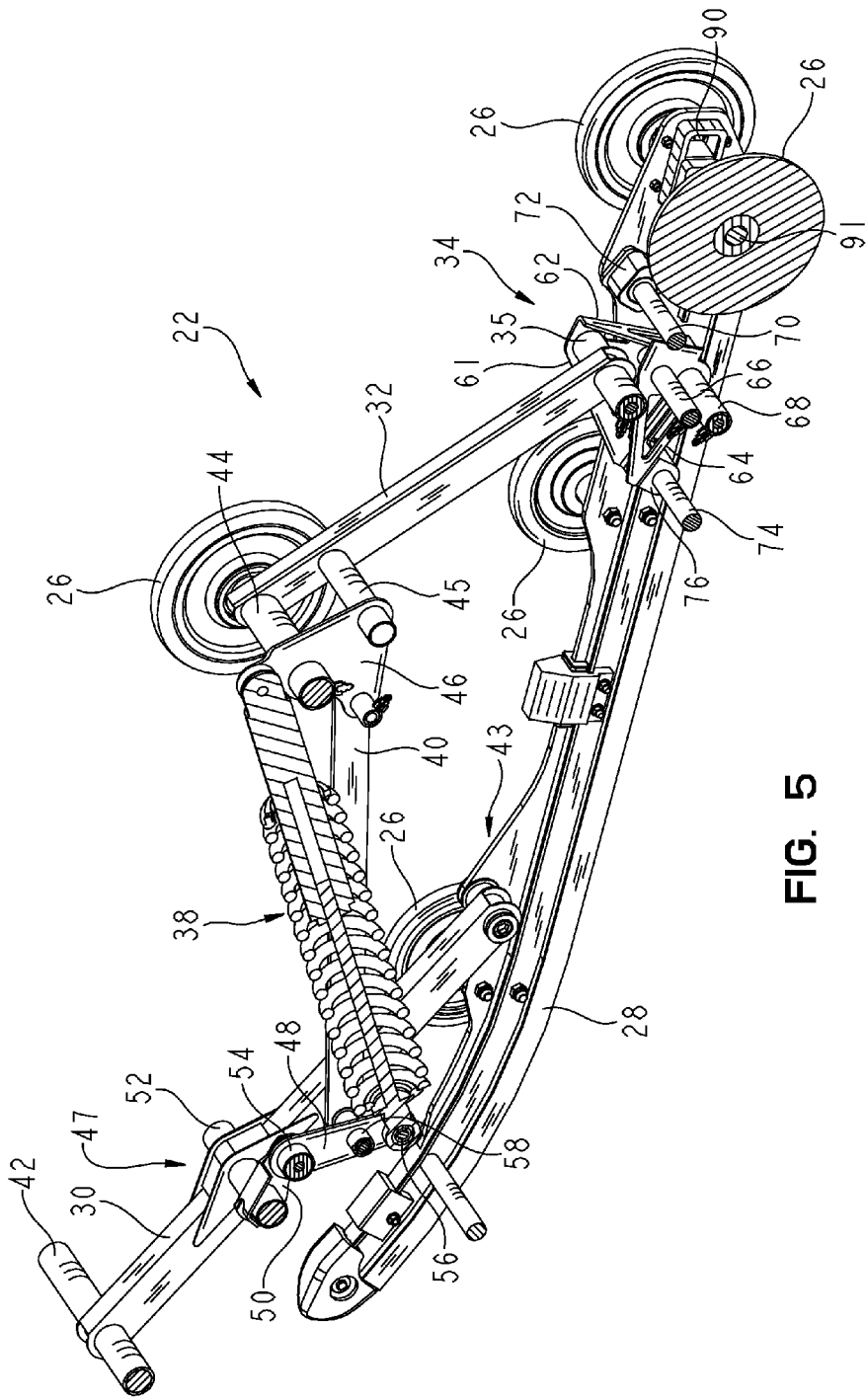
FIG. 5 is a cross-sectional view of the coupled rear suspension system shown in FIG. 4.
Figure 6:
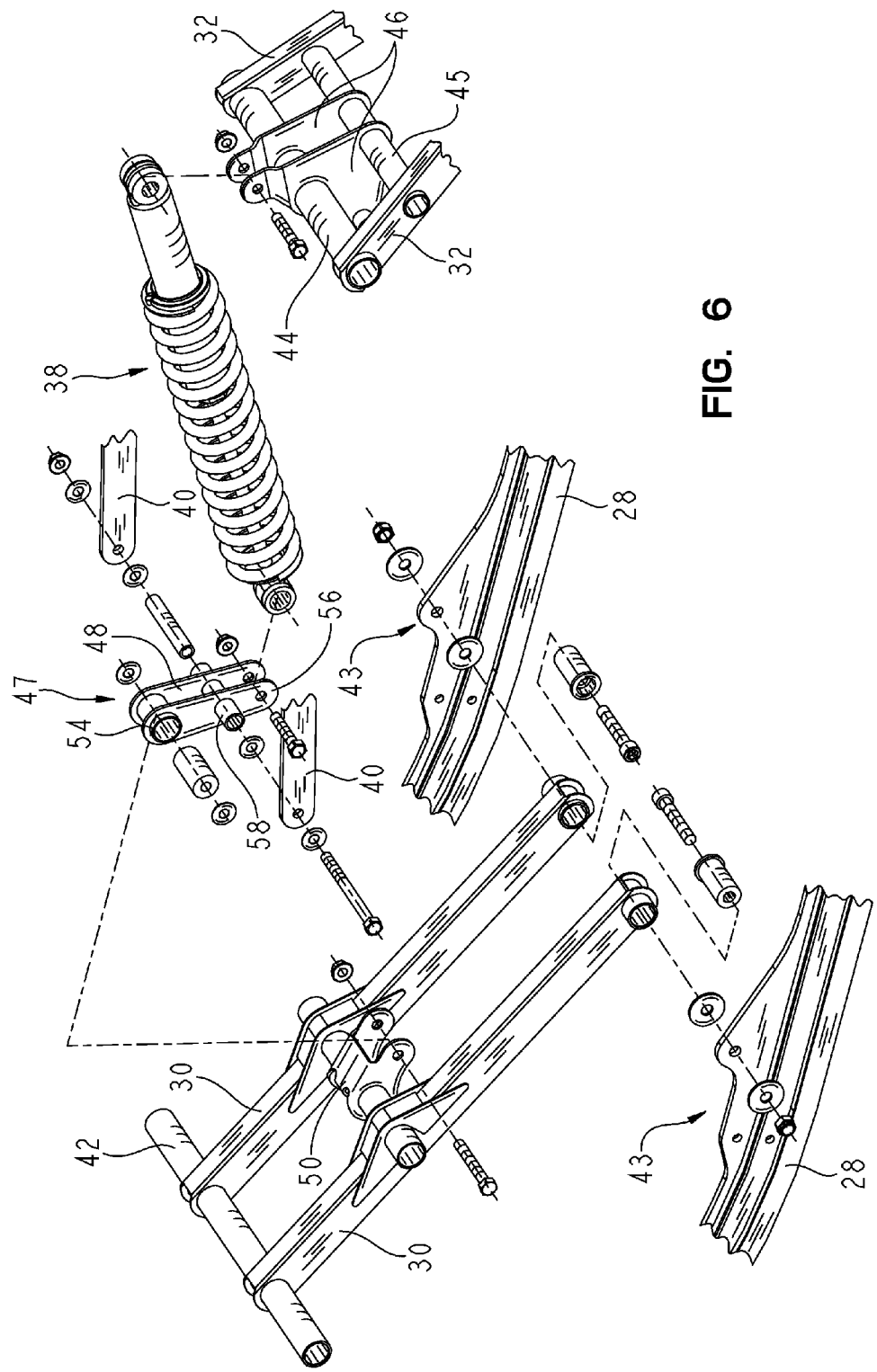
FIG. 6 is a partial, exploded view of the front portion of the coupled rear suspension system shown in FIGS. 3-5.
Figure 7:
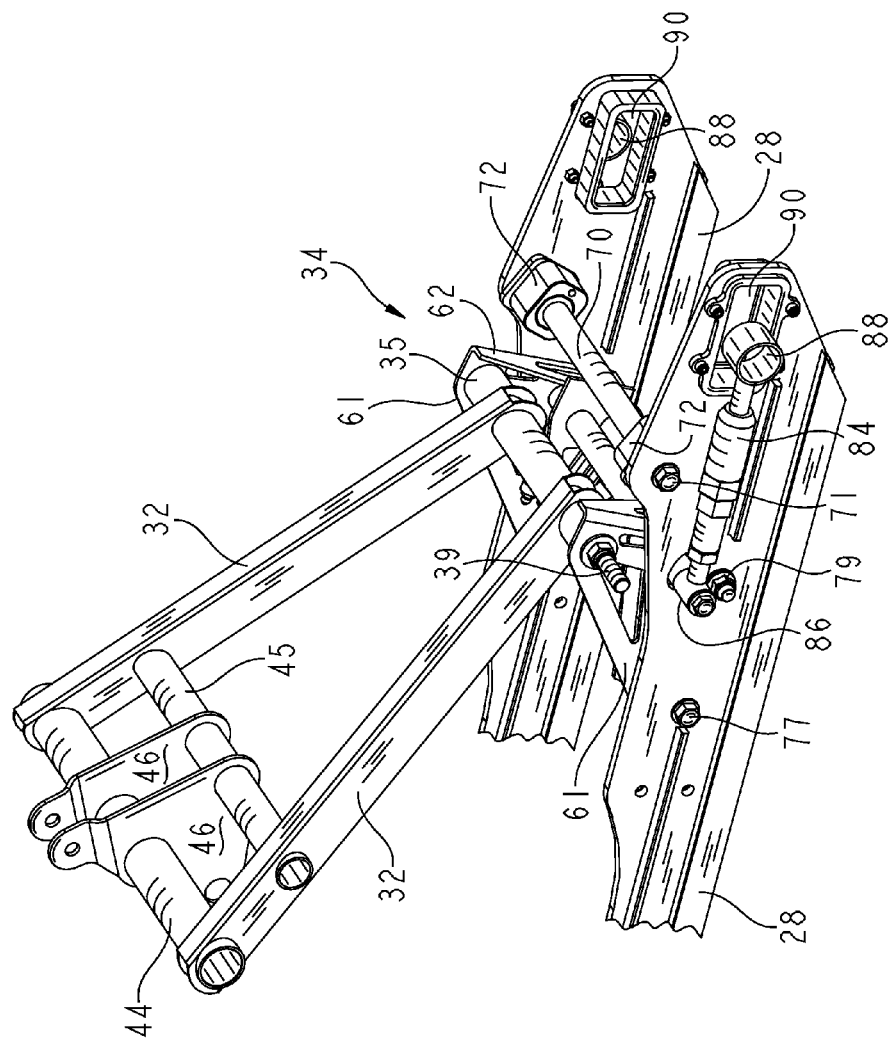
FIG. 7 is a perspective view of the rear portion of the coupled rear suspension system shown in FIGS. 3-6.
Figure 8:
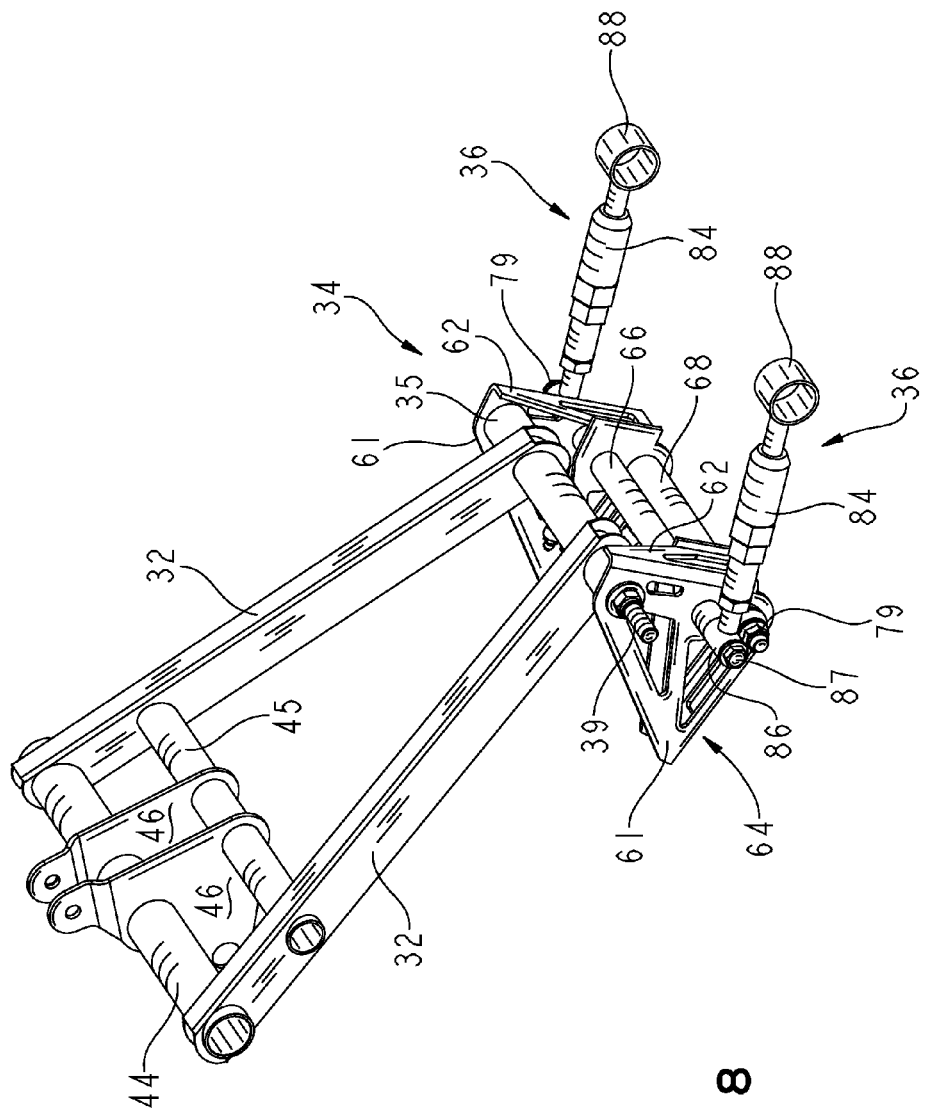
FIG. 8 is a perspective view of components of the rear portion of the coupled rear suspension system shown in FIG. 7.

Referring now to FIGS. 5 and 6, coupling link 48 is pivotally coupled on an upper end to bracket 50 which is mounted on cross shaft 52. Cross shaft 52 extends between front control arms 30 to provide strength and maintain front control arms 30 in a parallel relationship. Link 48 is pivotally coupled to bracket 50 at upper end 54 of link 48. Shock absorber 38 is coupled to link 48 at lower end 56 of link 48. Pull rods 40 are coupled to link 48 at pivot point 58, which is positioned between upper end 54 and lower end 56 of link 48. Shock absorber 38 and pull rods 40 are operatively coupled to front links 30 by link 48 and bracket 50. In this embodiment, bracket 50 is positioned about two-thirds of the length of front links 30 away from lower pivot point 43. In other embodiments, bracket 50 may be coupled to front links 30 at any position between lower pivot point 43 and cross shaft 42. However, in the preferred embodiment, bracket 50 is preferably coupled to front links 30 at a position spaced-apart from lower pivot points 43 by at least one-quarter of the length of front links 30.

Referring now to FIGS. 5-10, coupling member 34 is described. Rear control arms 32 are coupled together on their lower end by cross shaft 35. Cross shaft 35 is pivotally coupled between vertical plates 61 of coupling member 34 by bushing 37 and fastener 39. Vertical plates 61 of coupling member 34 are rigidly coupled together by cross shafts 66 and 68. In this embodiment, vertical plates 61 are substantially triangularly shaped, however any suitable shape may be used. Bushing 78 and fastener 79 extend through cross shaft 68 and apertures in lower rails 28 to pivotally couple coupling member 34 between lower rails 28. Vertical plates 61 of coupling member 34 each include a back plate 62 and a lower plate 64.

Figure 9:
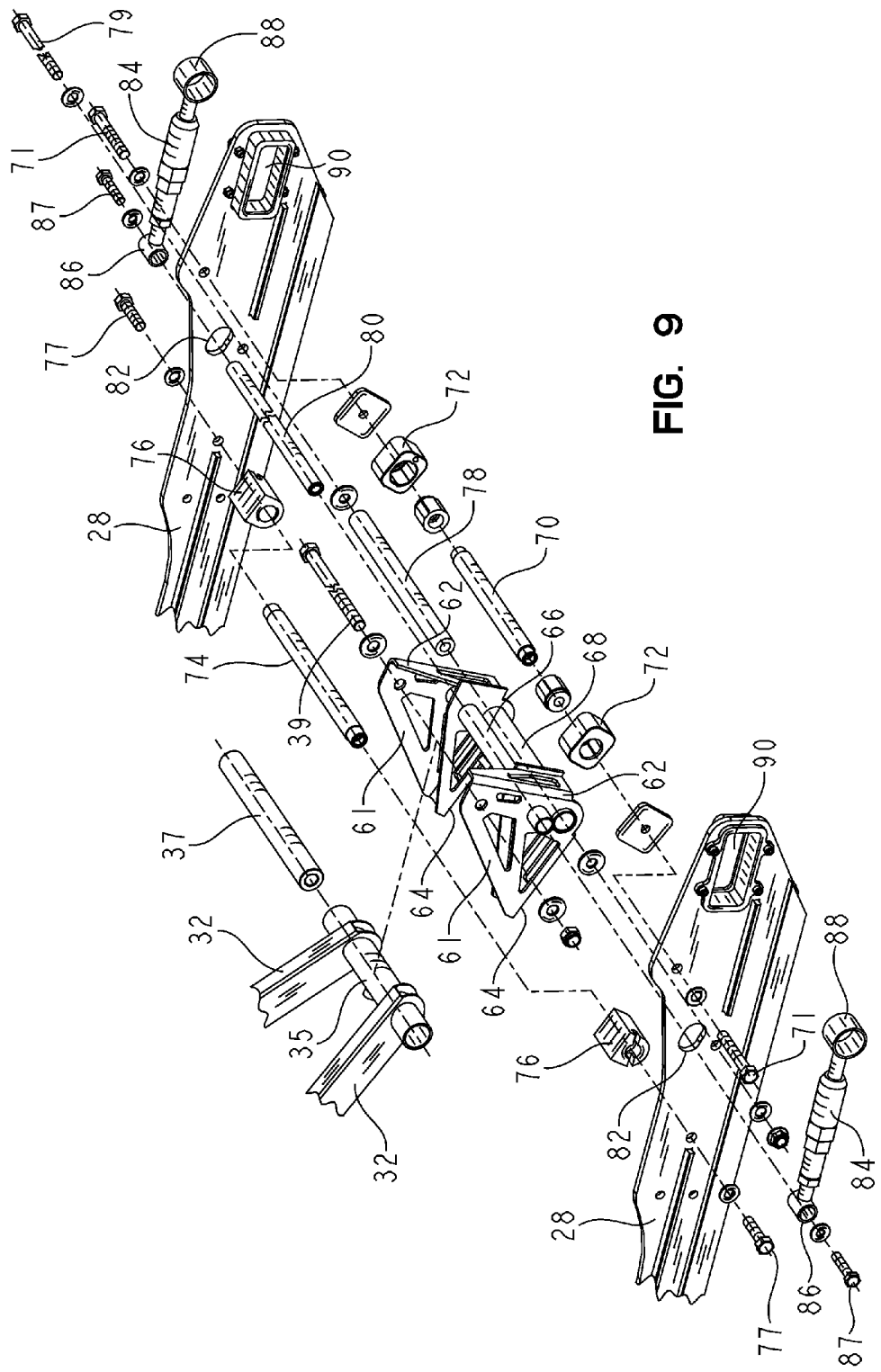
FIG. 9 is a partial, exploded view of the rear portion of the coupled rear suspension system shown in FIGS. 3-8.

Suspension system 22 also includes a pair of bump stops 72 positioned on cross shaft 70 (FIG. 7) which is coupled between lower rails 28. Cross shaft 70 is coupled to lower rails 28 by fasteners 71. A second pair of bump stops 76 (FIG. 10) is positioned on cross shaft 74. Cross shaft 74 is coupled between lower rails 28 by fasteners 77 (FIG. 9). In this embodiment, second pair of bump stops 76 is positioned substantially below first pair of bump stops 72, as will be described further herein.

Figure 10:
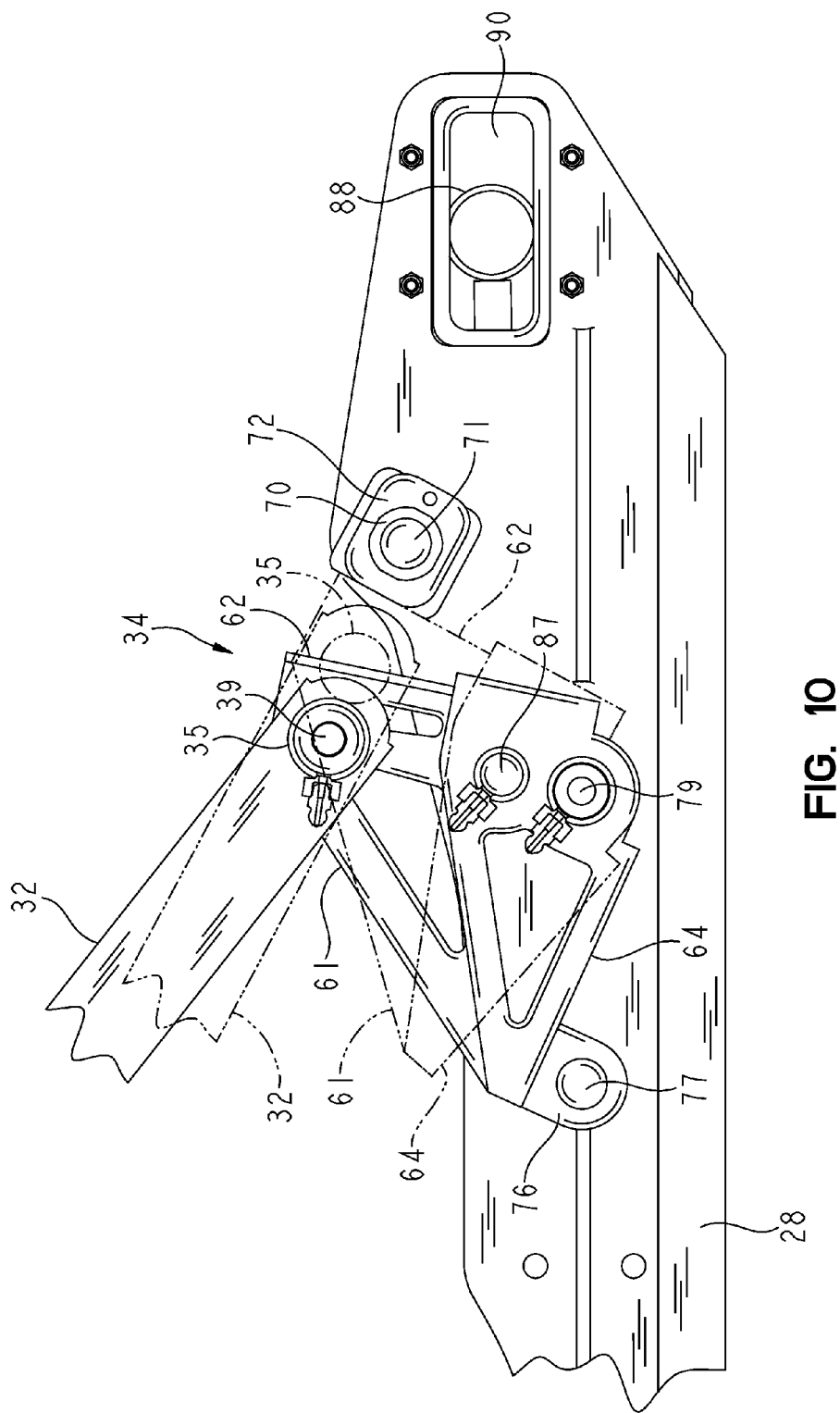
FIG. 10 is a profile view of the rear portion of the coupled rear suspension system shown in FIG. 9, the rear suspension is shown in a first position in solid lines and a second position shown in phantom.

As shown in FIG. 10, coupling member 34 rotates about an axis defined by fastener 79. The range of motion or degrees of freedom of movement of coupling member 34 is limited by bump stops 72 and 76. When endless belt assembly encounters a bump or sudden change in elevation, coupling member 34 rotates about fastener 79 and moves from a first position (shown in solid lines) in which lower plates 64 abut bump stops 76 to a second position (shown in phantom) in which back plates 62 abut bump stops 72. When coupling member 34 is in the first position, lower plates 64 exert both a horizontal and vertical force on bump stops 76, however the vertical force is greater than the horizontal force. It should be understood that lower plates 64 may be constructed to any suitable length, however lengthening lower plates 64 and moving bump stops 76 away from the axis defined by fastener 79 effectively lengthens a moment arm defined by lower plates 64 and reduces the contact force between lower plates 64 and bump stops 76.

During movement of coupling member 34 from the first position to the second position, the angle between rear control arms 32 and lower rails 28 decreases and the effective length of lower rails 28 is lengthened relative to the four-bar orientation of chassis 12, lower rails 28, front control arms 30, and rear control arms 32. The effect of lengthening the lower rails 28 during a sudden change in elevation or jounce stiffens suspension system 22 and helps endless belt assembly 14 maintain contact with the ground during jounce and weight transfer caused by acceleration.

Referring back to FIGS. 8 and 9, belt tensioning assembly 36 includes a pair of extendable links 84 including first ends 86 and second ends 88. Links 84 may be extended or retracted to adjust the tension of belt 24. First ends 86 are pivotally coupled to coupling member 34. Coupling member 34 includes a cross shaft 66 coupled between vertical plates 61. Bushing 80 extends through cross shaft 66 and apertures 82 in lower rails 28. In this embodiment, apertures 82 are profiled as slightly elongated slots, however any suitably shaped aperture may be used. First ends 86 of links 84 are coupled to the ends of bushing 88 by fasteners 87.

Referring now to FIG. 3, the second ends 88 of links 84 are coupled to cross shaft 91. Cross shaft 91 extends through apertures 90 in lower rails 28 and supports idler rollers 26 (FIG. 4). Idler rollers 26 support belt 24 and rotate about cross shaft 91. Links 84 translate the movement of coupling member 34 to cross shaft 91 to adjust the tension of belt 24 during movement of suspension system 22. As coupling member 34 moves between the first and second positions, as discussed above, links 84 move cross shaft 91 and idler rollers 26 frontward or rearward to maintain the appropriate tension of belt 24.

Figure 11:
FIG. 11 is a profile view of another embodiment of a snowmobile having a coupled rear suspension.

Referring now to FIG. 11, another embodiment of a snowmobile 110 is shown. Snowmobile 110 includes a chassis 112, an endless belt assembly 114, and a pair of front skis 120. Snowmobile 110 also includes a front-end 116 and a rear-end 118. Snowmobile 110 is similar to snowmobile 10 shown in FIG. 1 with the exception of endless belt assembly 114, which is explained below.

Figure 12:
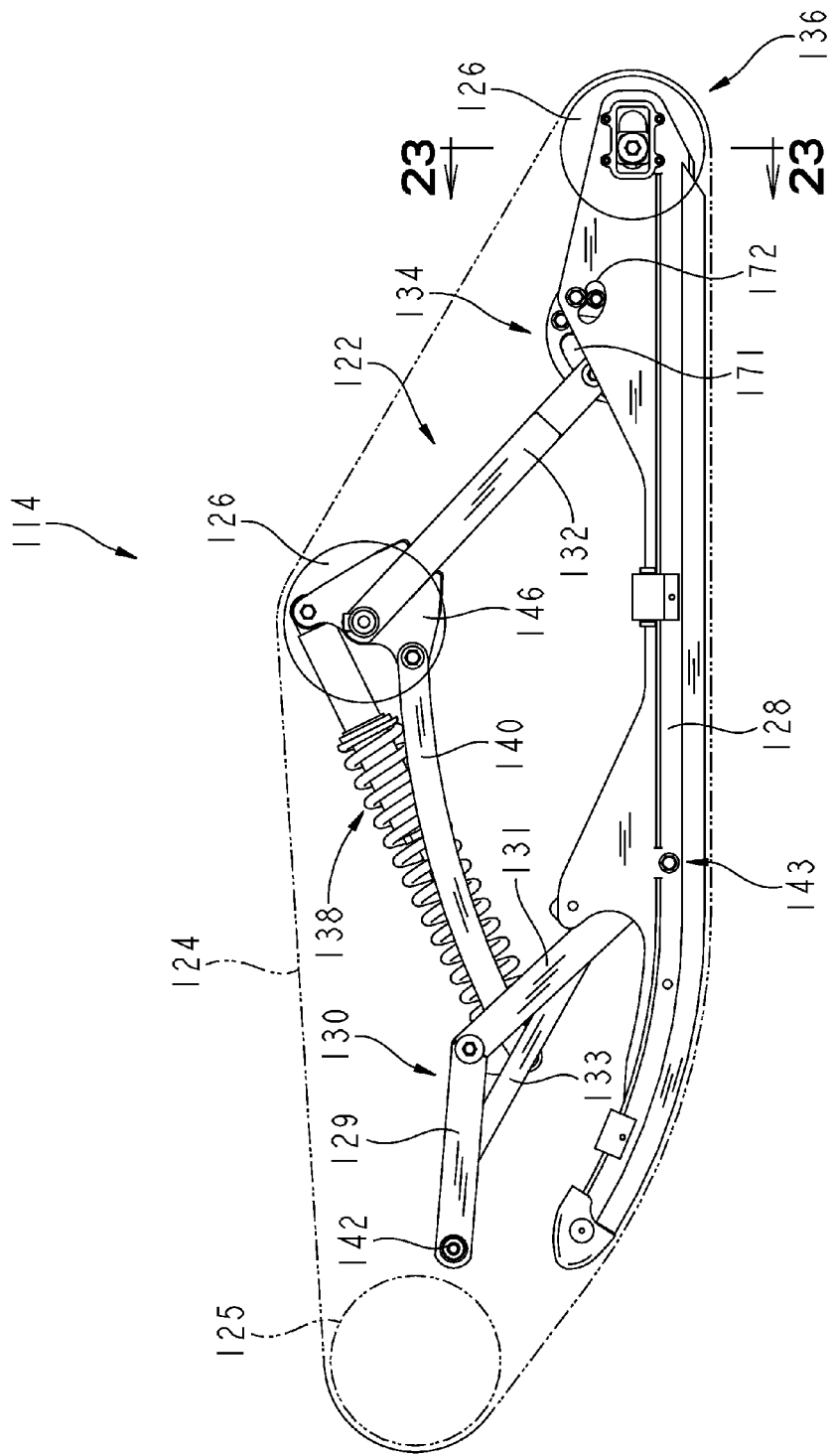
FIG. 12 is a profile view of the endless belt assembly of the snowmobile shown in FIG. 11.
Figure 13:
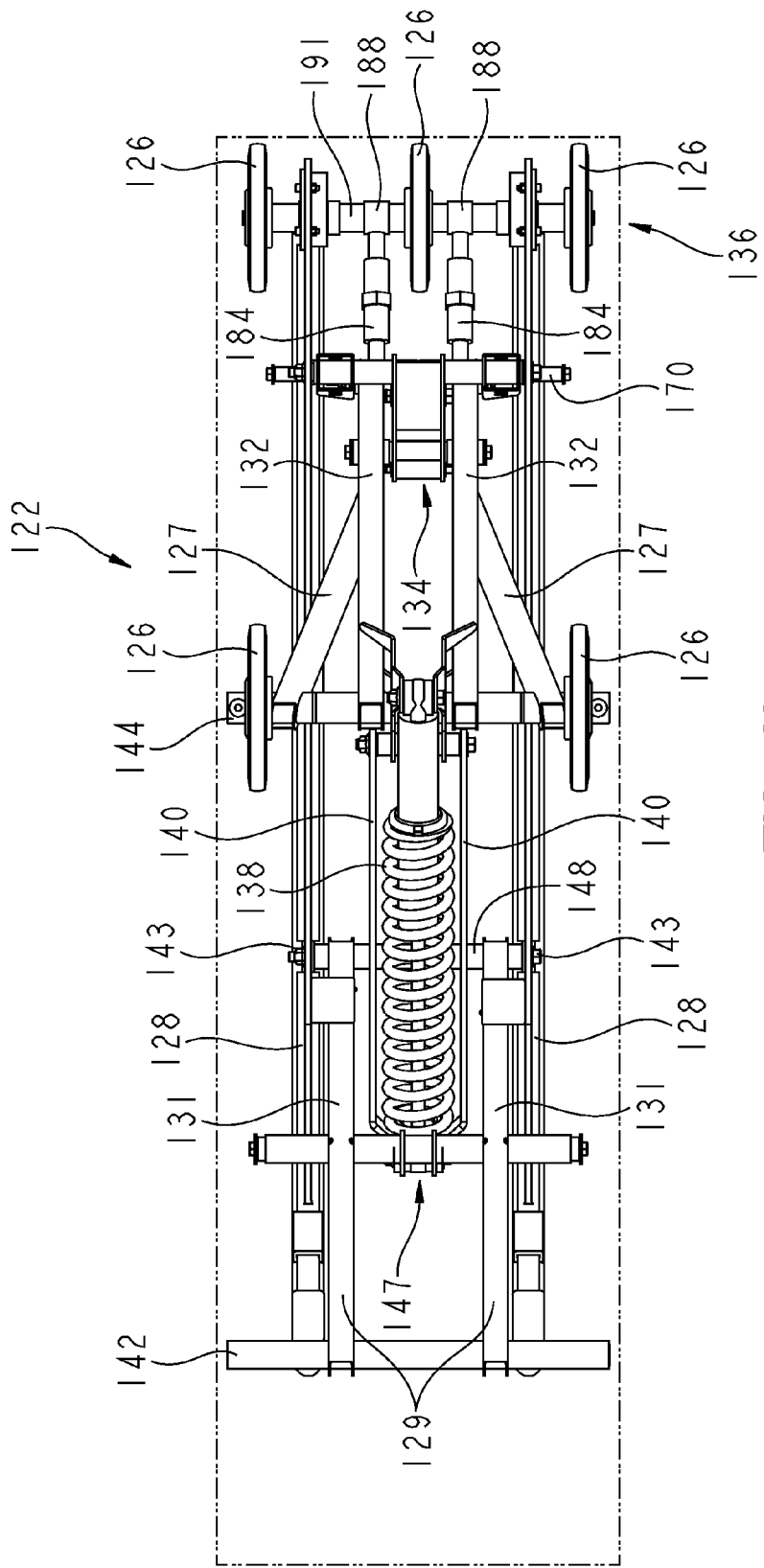
FIG. 13 is a top view of the coupled rear suspension system of the endless belt assembly shown in FIG. 12.
Figure 14:
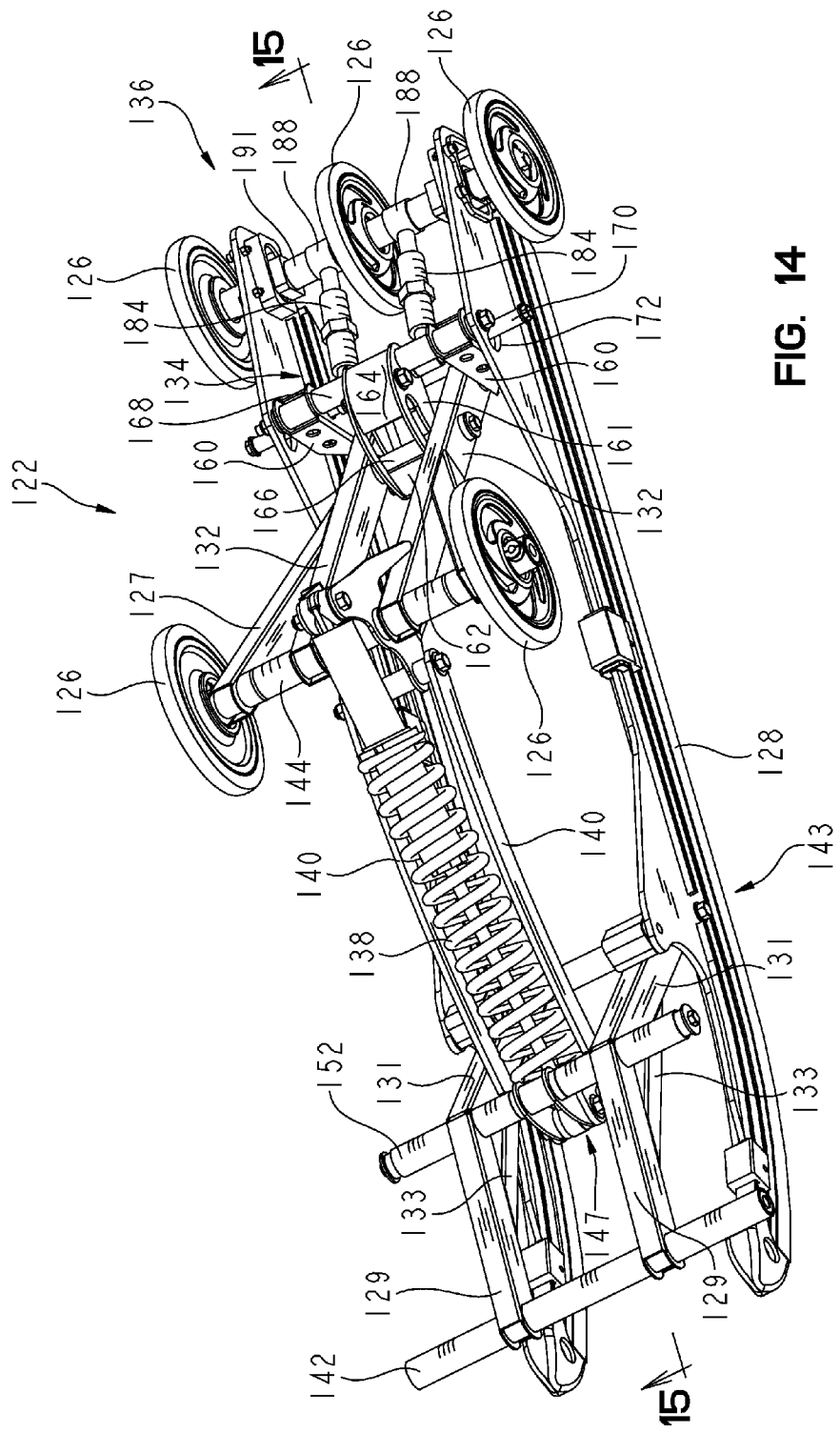
FIG. 14 is an elevated, perspective view of the coupled rear suspension system shown in FIG. 13.

Referring now to FIGS. 12-14, endless belt assembly 114 includes a coupled rear suspension system 122 and a belt 124. Belt 124 extends around powered roller 125 and idler rollers 126 which are mounted at various locations on suspension system 122. Similar to roller 25, discussed above, roller 125 is powered by an engine (not shown) and transmission (not shown) of snowmobile 110. In operation roller 125 rotates about its central axis to move belt 124 around endless belt assembly 114 to propel snowmobile 110.

Figure 15:
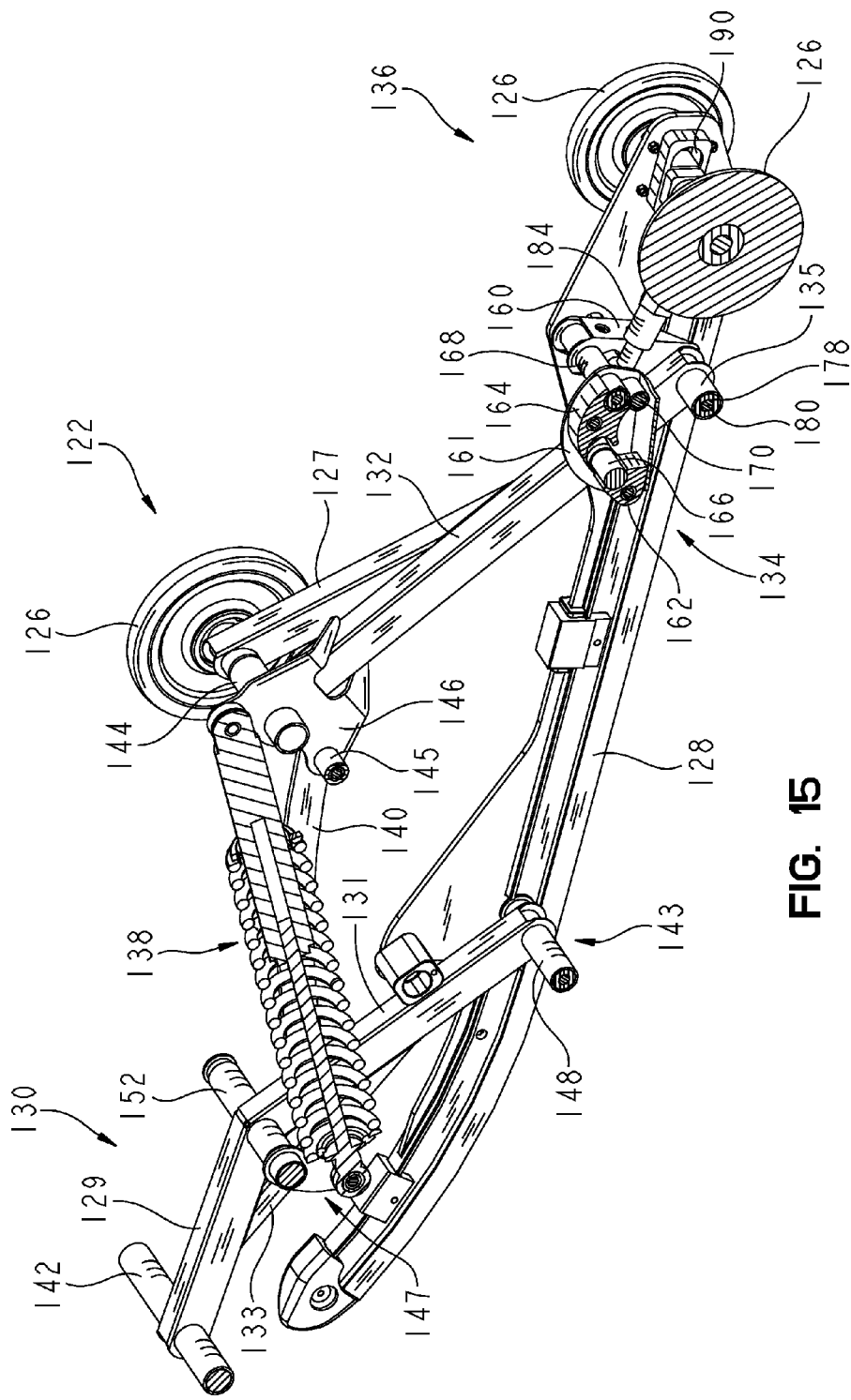
FIG. 15 is a cross-sectional view of the of coupled rear suspension system shown in FIG. 14.

Suspension system 122 includes a pair of spaced part lower rails 128, a pair of front control arms 130, a pair of rear control arms 132, a coupling member 134, and a belt tensioning assembly 136. In this embodiment, front control arms 130 include upper and lower portions 129 and 131, respectively. Each upper portion 129 is interconnected with each lower portion 131 by cross shaft 152 (FIG. 14). Each front control arm 130 also includes a bracing member 133 extending between upper portion 129 and lower portion 131 to provide added strength. Front control arms 130 are coupled together on an upper end by cross shaft 142. Cross shaft 142 couples to chassis 112 of snowmobile 110. Similarly rear control arms 132 are coupled together by cross shaft 144 which is coupled to chassis 112 of snowmobile 110. Rear control arms 132 include bracing members 127 which couple to rear control arms 132 on a lower end and couple to cross shaft 144 on an upper end. When suspension system 122 is in the coupled state, chassis 112, front control arms 130, rear control arms 132, and lower rails 128 form a four-bar linkage. Front control arms 130 are pivotally coupled to lower rails 128 at lower pivot points 143. Rear control arms 132 are coupled to cross shaft 135 (FIG. 15). Cross shaft 135 is coupled to inverted links 160 by bushing 178 and fastener 180. Coupling member 134 is pivotally coupled to lower rails 128 by bushing 174 and fastener 176 which extend through cross shaft 168. Coupling member 134 is described in more detail below.

Figure 16:
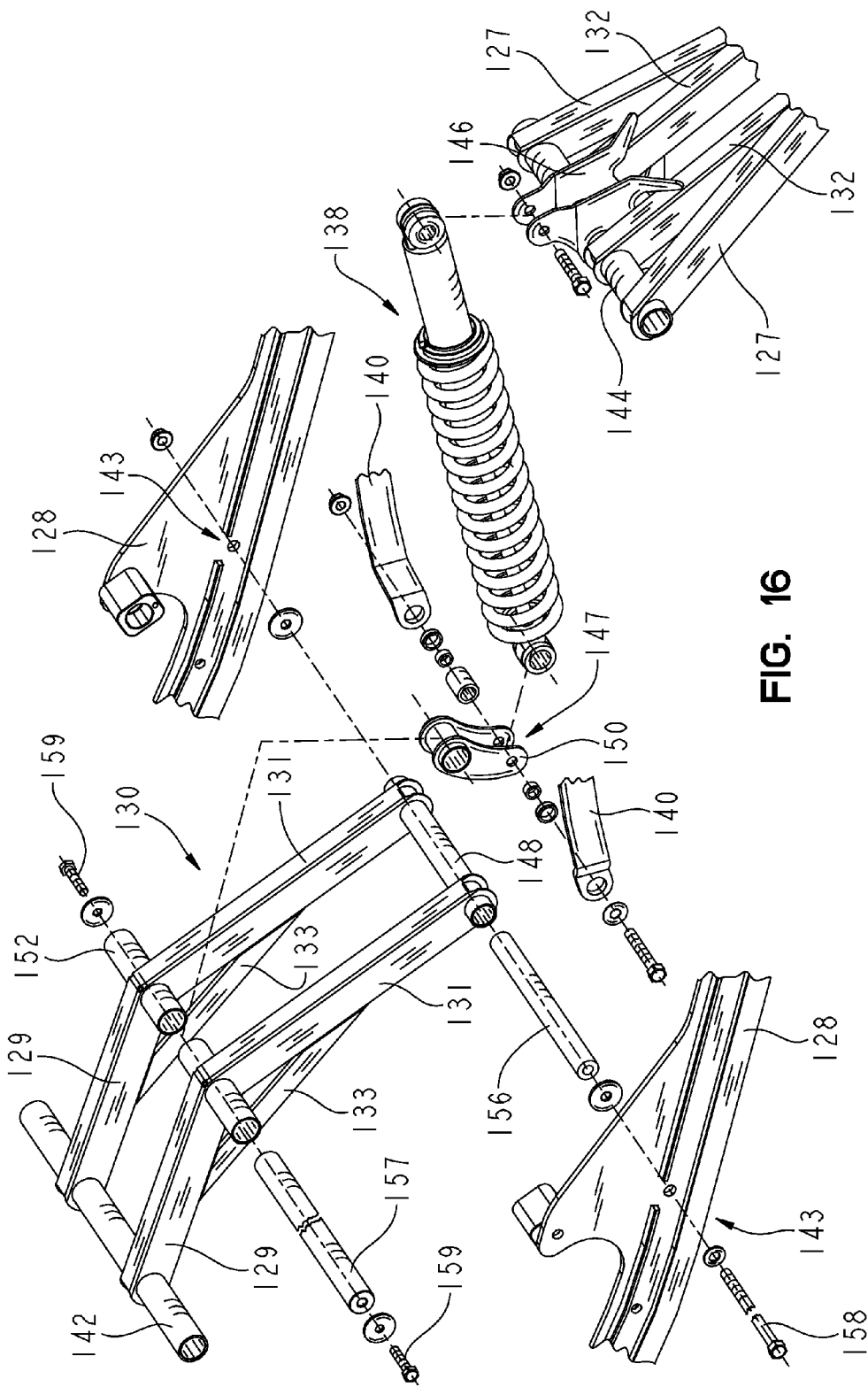
FIG. 16 is a partial, exploded view of the front portion of the coupled rear suspension system shown in FIGS. 13-15.
Figure 17:
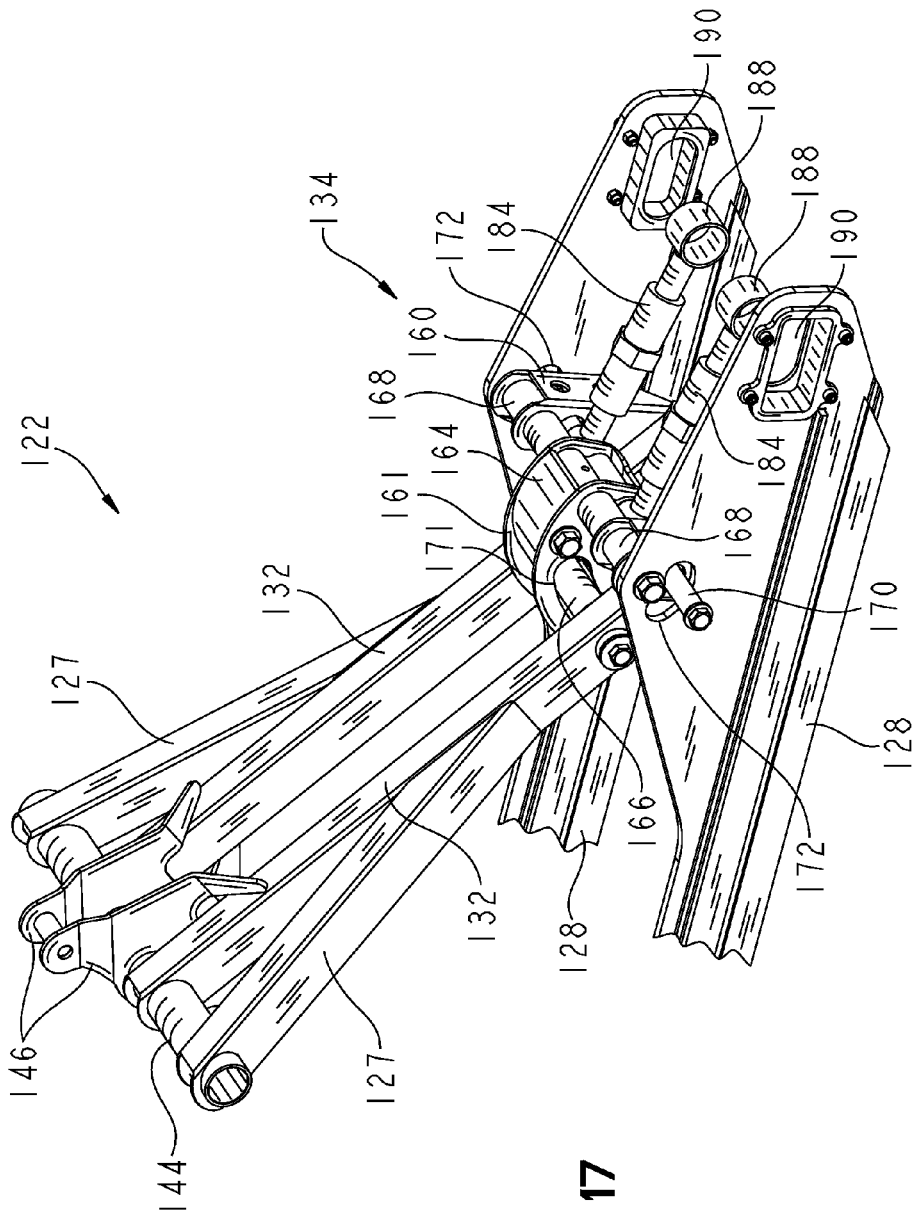
FIG. 17 is a perspective view of the rear portion of the coupled rear suspension system shown in FIGS. 13-16.
Figure 18:
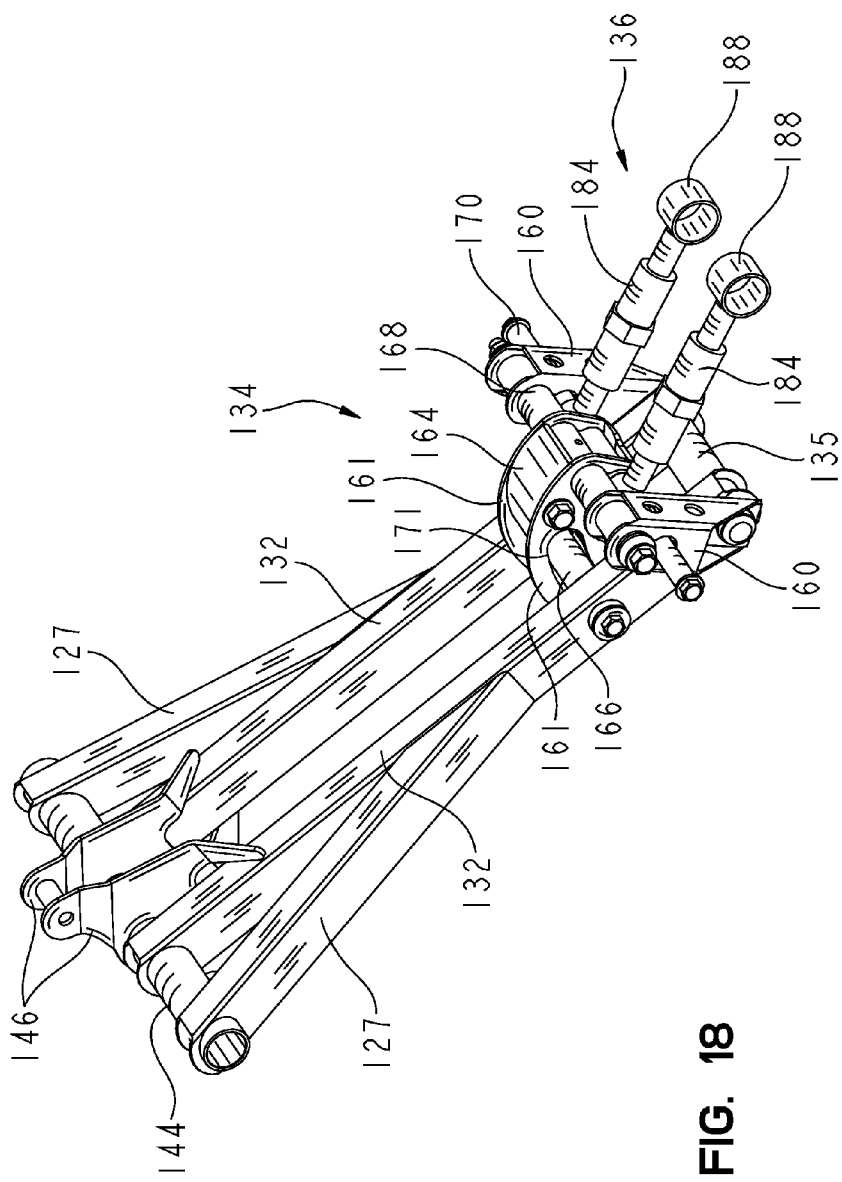
FIG. 18 is a perspective view of components of the rear portion of the coupled rear suspension system shown in FIG. 17.
Figure 19:
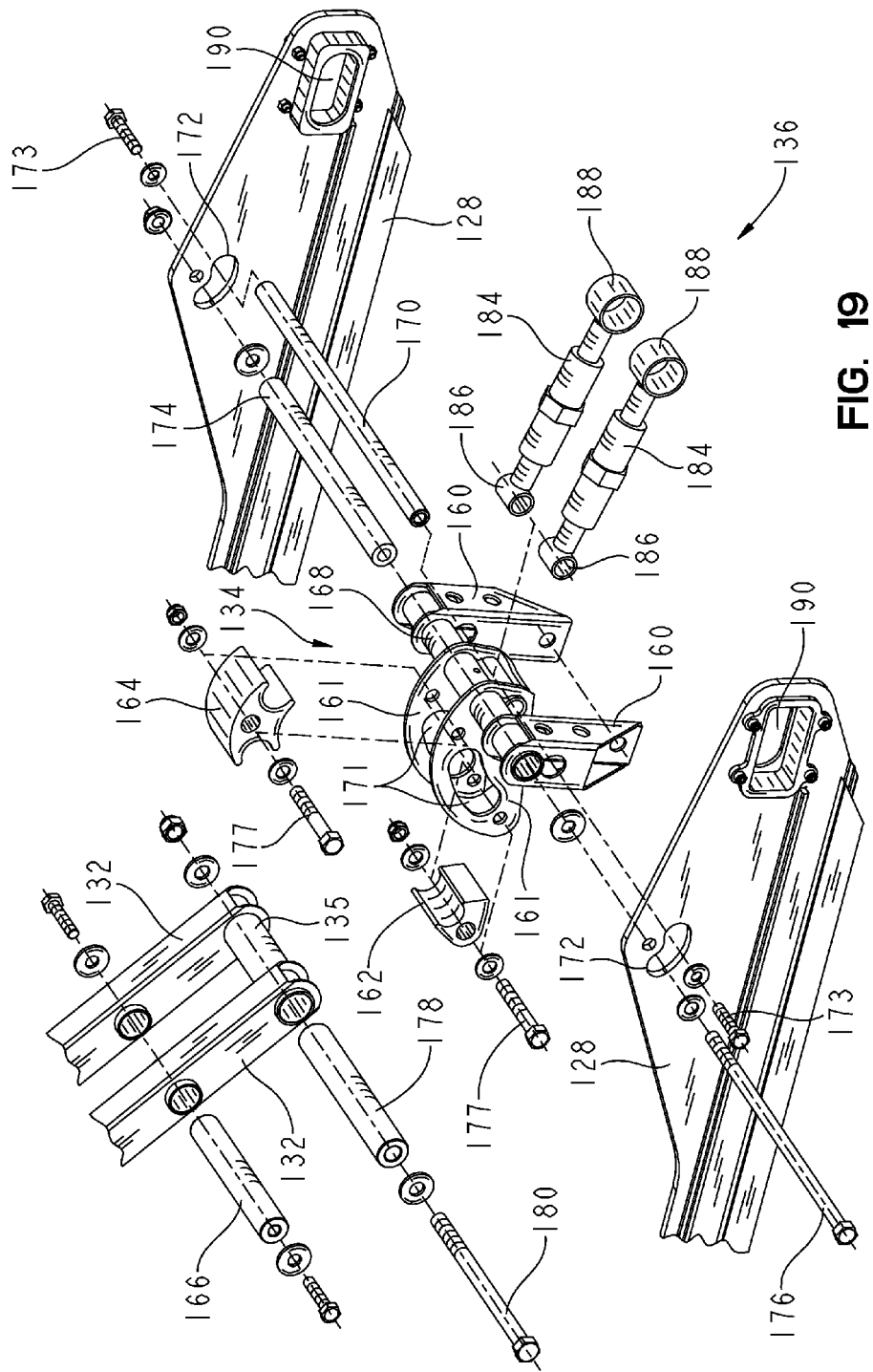
FIG. 19 is a partial exploded view of the rear portion of the coupled rear suspension system shown in FIGS. 13-18.

Referring now to FIGS. 15 and 16, coupled rear suspension system 122 also includes a shock absorber 138 and pull rods 140 which are coupled between front control arms 130 and cross shaft 144. The upper end of shock absorber 138 and pull rods 140 is coupled to a pair of plates 146 which are coupled to cross shaft 144. Plates 146 are rigidly coupled to cross shaft 144 to interconnect shock absorber 138 and pulls rods 140 with rear control arms 132. The lower ends of shock absorber 138 and pull rods 140 are coupled to linkage 147 which includes link 150. Pull rods 140 increase the rate of compression of shock absorber 138 when coupled rear suspension system 122 is compressed. Pull rods 140 and shock absorber 138 function in the same manner discussed above in the first embodiment, however, in this embodiment the lower ends of pull rods 140 and the lower end of shock absorber 138 are mounted coaxially on link 150.

Link 150 is pivotally coupled on an upper end to cross shaft 152. Cross shaft 152 is coupled to front control arms 130. Bushing 157 extends through cross shaft 152 and link 150 and receives fasteners 159 to pivotally couple link 150 to front control arms 132. Cross shaft 152 also provides strength and maintains front control arms 130 in a parallel relationship. In this embodiment, link 150 is spaced-apart from lower pivot points 143 by a distance equal to about one-half of the distance between cross shaft 144 and lower pivot points 143. In other embodiments, link 150 may be coupled to front links 130 at any position between lower pivot points 143 and cross shaft 142. However, in the preferred embodiment, link 150 is preferably coupled to front links 130 at a position at least one-quarter of the distance between cross shaft 142 and lower pivot points 143 above lower pivot points 143.

Referring now to FIGS. 15 and 17-20, coupling member 134 is described. Rear control arms 132 are coupled together on their lower end by cross shaft 135. Cross shaft 135 is pivotally coupled between inverted links 160 of coupling member 134 by bushing 178 and fastener 180. Coupling plates 161 of coupling member 134 are coupled together by cross shaft 168 and fasteners 177. In this embodiment coupling plates 161 have a semi-circular top profile, however any suitable shape may be used. Coupling plates 161 each include a slot 171 positioned coaxial to one another. Stops 162 and 164 are positioned between coupling plates 161 and are secured by fasteners 177. As discussed above, bushing 174 and fastener 176 extend through cross shaft 168 and apertures in lower rails 128 to pivotally couple coupling member 134 between lower rails 128. Stops 162 and 164 may be constructed of metal, rubber, plastic, or any suitable substance.

As discussed above, the lower end of rear control arms 132 is couple to cross shaft 135. Fastener 180 extends though apertures in the lower end of inverted links 160 and bushing 178, which is positioned in cross shaft 135, to operably couple rear control arms 132 to coupling member 134. Cross shaft 166 is coupled between rear control arms 132 and extends through slots 171 in inverted links 160 in coupling member 134.

Figure 20:
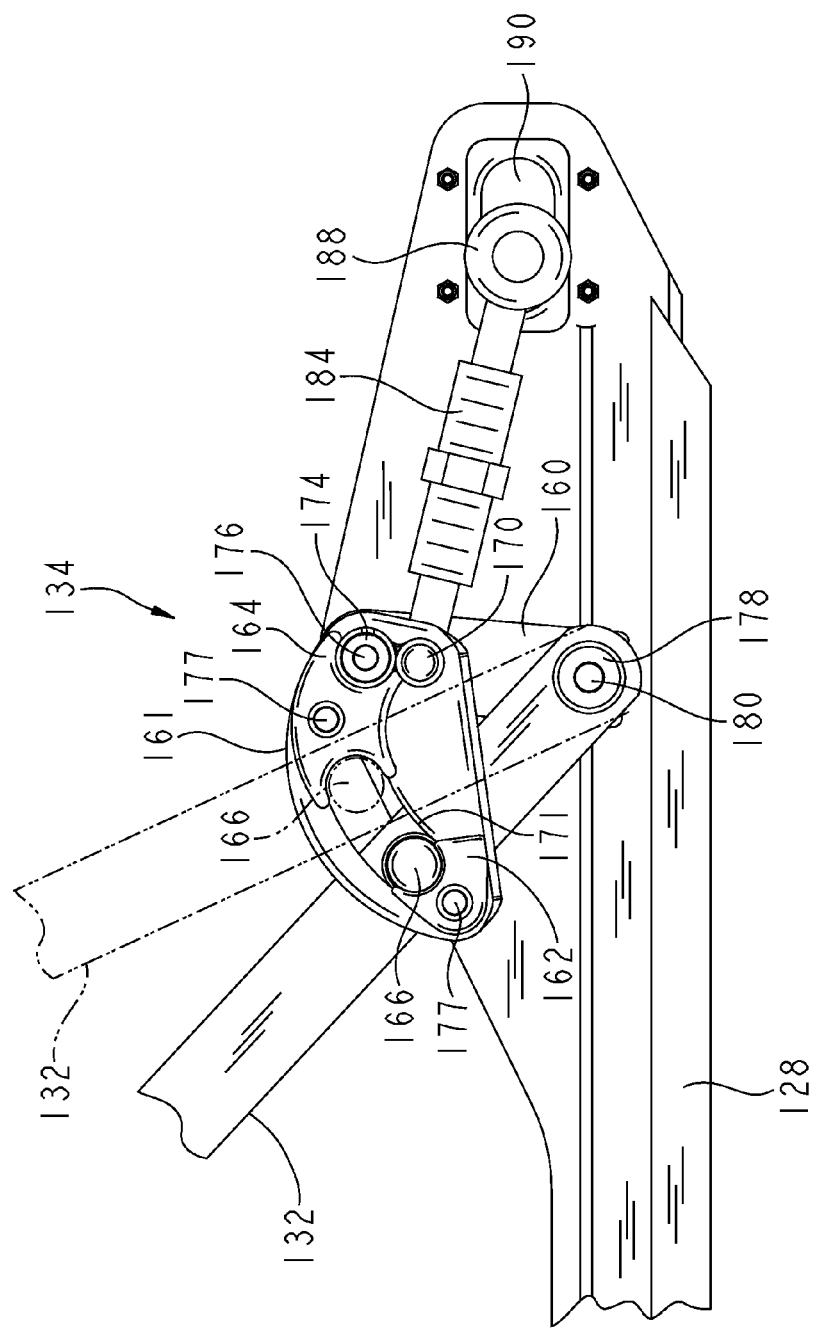
FIG. 20 is a profile view of the rear portion of the coupled rear suspension system shown in FIG. 19, the rear suspension is shown in a first position in solid lines and a second position shown in phantom.
Figure 21:
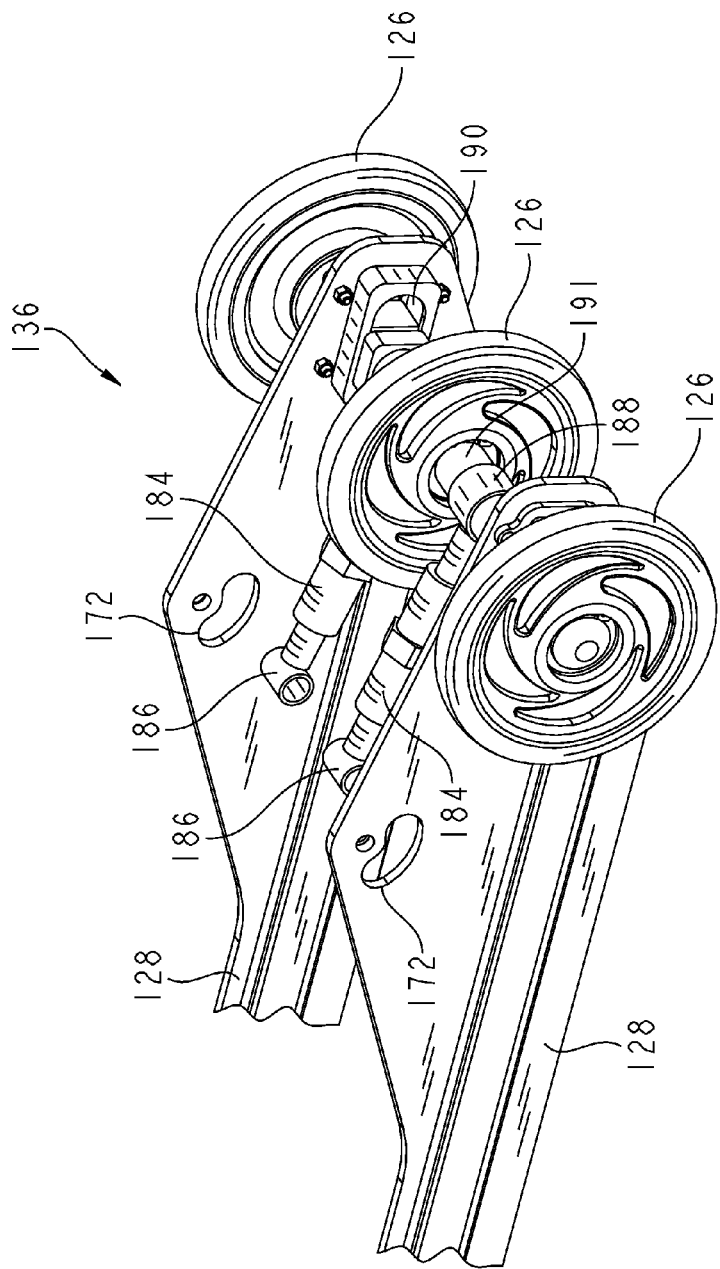
FIG. 21 is a partial, perspective view of the belt tensioning assembly of the coupled rear suspension system shown in FIGS. 11-20.
Figure 22:
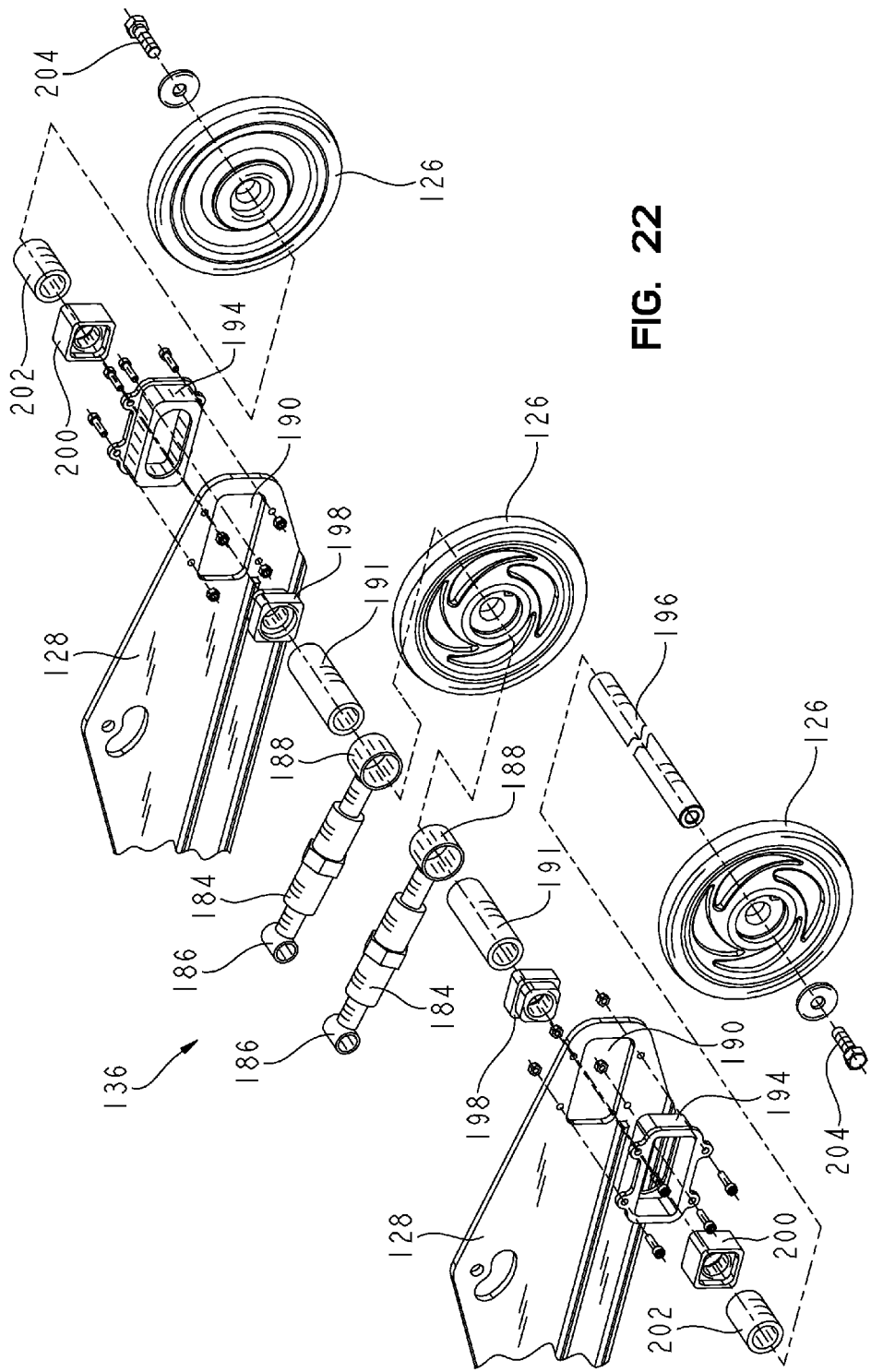
FIG. 22 is a partial, exploded view of the belt tensioning assembly shown in FIG. 21.
Figure 23:
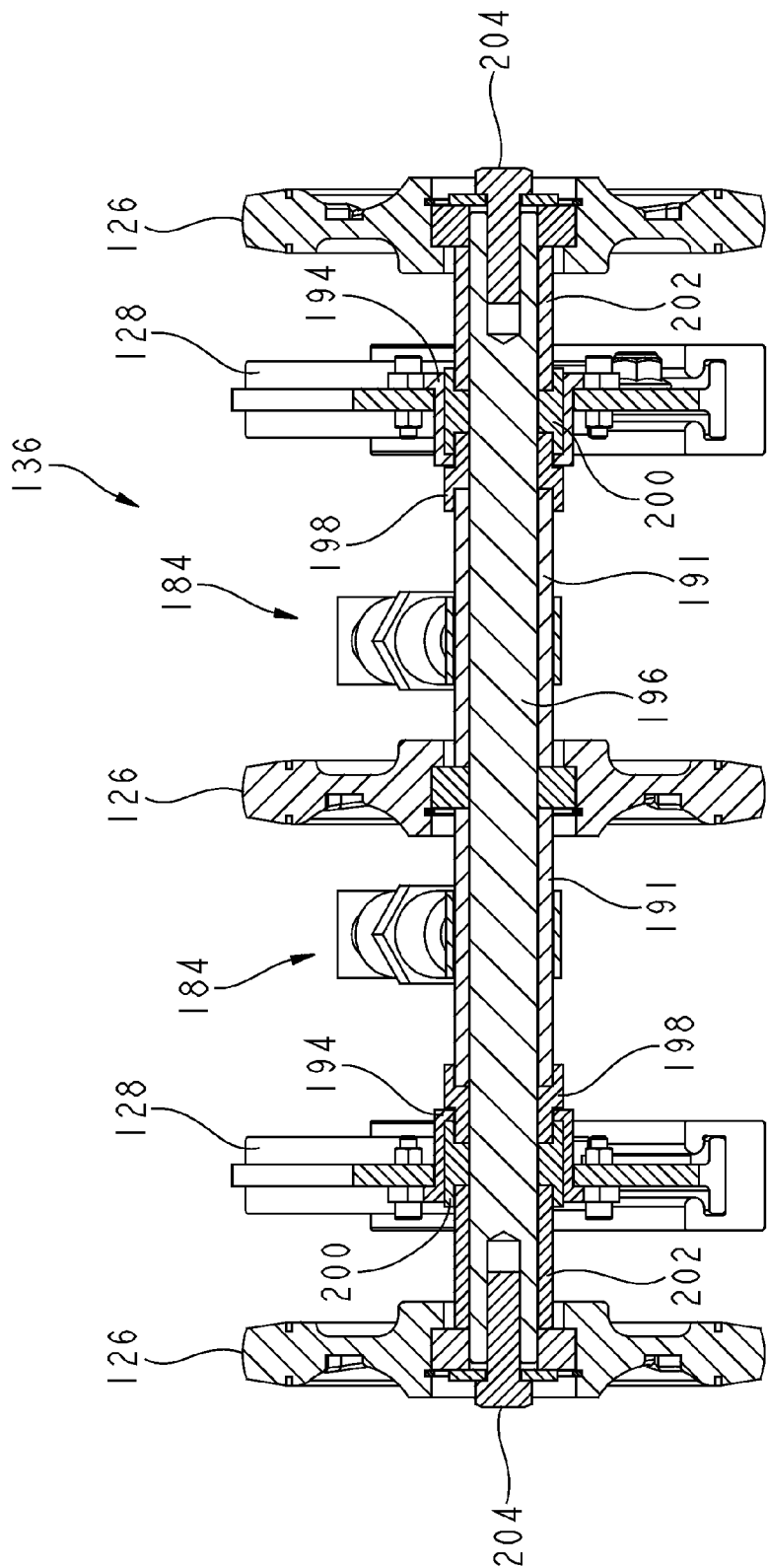
FIG. 23 is a cross-sectional view of the belt tensioning assembly shown in FIGS. 21 and 22.

As shown in FIG. 20, rear control arms 132 rotate about an axis defined by fastener 180. In this embodiment, the position of the pivot point of rear control arms 132, the axis defined by fastener 180, is located below the location of the coupling point, cross shaft 166, of rear control arms 132. The range of motion or degrees of freedom of movement of rear control arms 132 is limited by stops 162 and 164 and/or slots 171 of coupling member 134. When endless belt assembly 114 encounters a bump or sudden change in elevation, rear control arms 132 rotate about an axis defined by fastener 180 and moves from a first position (shown in solid lines) in which cross shaft 166 abuts stop 162 to a second position (shown in phantom) in which cross shaft 166 abuts stop 164. During this movement, rear suspension 122 is in an "uncoupled" state.

When cross shaft 166 abuts stop 162 and rear control arms 132 continue to move toward lower rails 128, coupling member 134 is forced to rotate downward about an axis defined by fastener 176. When this occurs, suspension 122 returns to a "coupled" state. Similarly, when cross shaft 166 abuts stop 166 and rear control arms 132 continues to move away from lower rails 128, coupling member 134 is forced to rotate upward about an axis defined by faster 176. When this occurs, suspension system 122 once again returns to a "coupled" state. The inverted pivot orientation of coupling member 134 and rear control arms 132 decreases and the effective length of rear control arms 132 relative to the four-bar orientation of chassis 112, lower rails 128, front control arms 130, and rear control arms 132. The effect of shortening rear control arms 130 during a sudden change in elevation or jounce stiffens suspension system 122 and helps endless belt assembly 114 maintain contact with the ground during jounce and/or weight transfer caused by acceleration. In other embodiments (not shown), coupling member 134 may include multiple bump stops or may be constructed to form a slotted link to limit the degree of freedom between coupling member 134 and rear control arms 132.

Referring now to FIGS. 18-23, belt tensioning assembly 136 is shown. Belt tensioning assembly 136 is similar to belt tensioning assembly 36 described above and shown in FIGS. 1-10. Belt tensioning assembly 136 includes a pair of extendable links 184 including first ends 186 and second ends 188. Links 184 may be extended or refracted to adjust the tension of belt 124. First ends 186 are pivotally coupled to inverted links 160 of coupling member 134 by cross shaft 170. Cross shaft 170 extends through slots 172 in lower rails 128, apertures in inverted links 160, and first ends 186 of links 184. Fasteners 173 are received in cross shaft 170 to secure it in slots 172. In this embodiment, slots 172 are elongated semi-circular slots, however any suitably shaped aperture may be used.

Second ends 188 of links 184 are supported by cross shafts 191. Cross shaft 191 extends into bushings 198. Bushings 198 interact with apertures 190 in lower rails 28 and slide blocks 194. Slide blocks 194 are coupled to lower rails 128 and are positioned in apertures 190. Spacers 200 and bushings 202 are positioned between slide blocks 194 and idler rollers 126. Bushing 196 extends through idler wheels 126, bushings 202, spacers 200, slide blocks 194, bushings 198, crossbar 191, and second ends 188 of links 184. Fasteners 204 are received by bushing 196 to secure the assembly. Idler rollers 126 support belt 124 and rotate about bushing 196. Links 184 translate the movement of coupling member 134 to bushing 196 to adjust the tension of belt 124 during movement of suspension system 122. As coupling member 134 moves between the first and second positions, as discussed above, links 184 move bushing 196 and idler rollers 126 fore and aft along a longitudinal axis defined by lower rails 128 to maintain the appropriate tension of belt 124.

Figure 24:
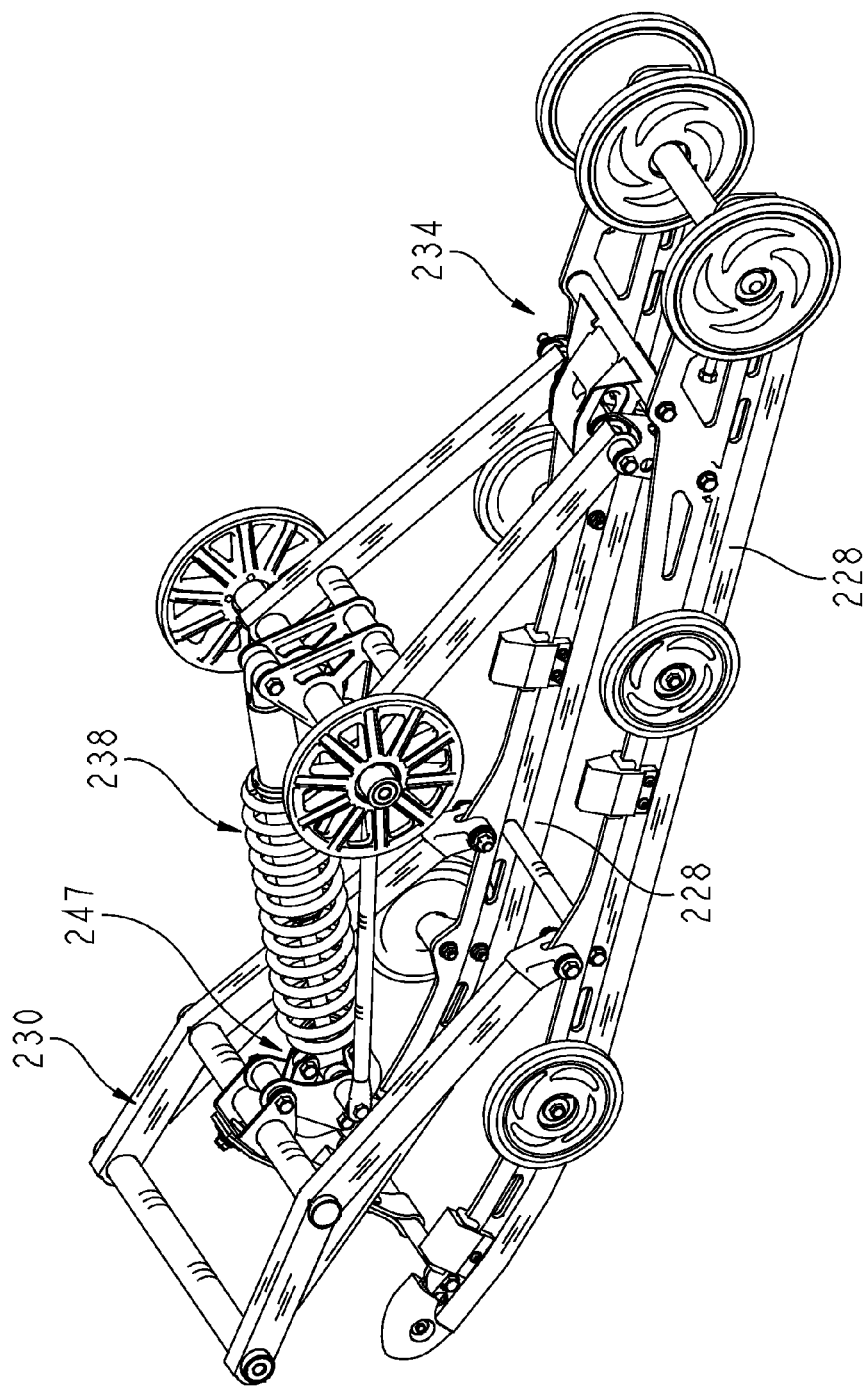
FIG. 24 shows an alternative front shock mount assembly.
Figure 25:
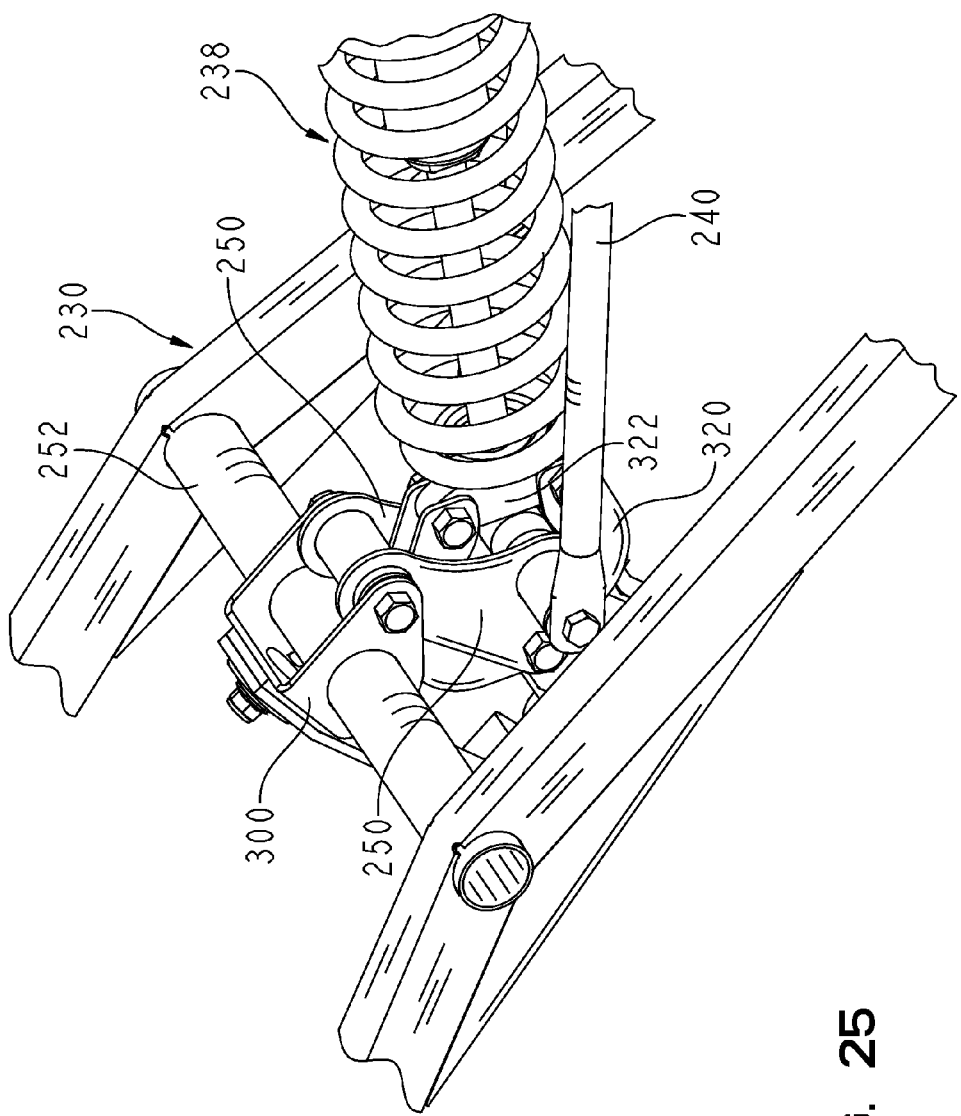
FIG. 25 is an enlarged view of the mount shown in FIG. 24.
Figure 26:
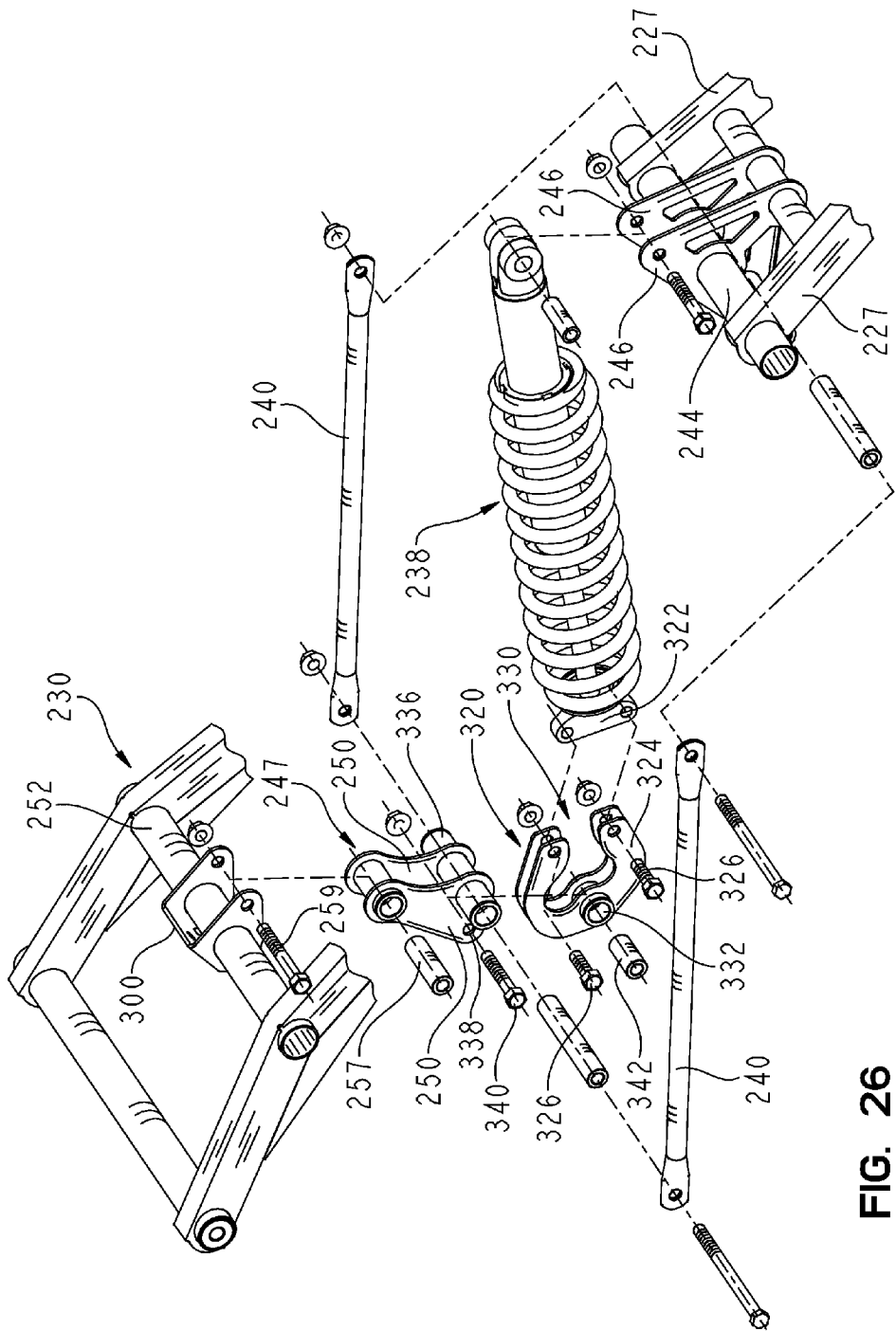
FIG. 26 is an exploded view of the shock mount assembly of FIG. 24.

Referring now to FIGS. 24-26, a snowmobile suspension is described with a coupling member 234 similar in nature to coupling member 134 (FIG. 14), yet with a different mounting system at the front end of shock absorber 238. This system generally includes shock absorber or LFE 238 and pull rods 240 which are coupled between front control arms 230 and cross shaft 244 (FIG. 26). The upper end of shock absorber 238 and pull rods 240 are coupled to a pair of plates 246 which are coupled to cross shaft 244. Plates 246 are rigidly coupled to cross shaft 244 to interconnect shock absorber 238 and pulls rods 240 with rear links 227. As best shown in FIG. 25, the lower end of shock absorber 238 and pull rods 240 are coupled to linkage 247 which, includes links 250. Linkage 247 in turn is pivotally attached to cross shaft 252 by way of pivot bracket 300. Pull rods 240 increase the rate of compression of shock absorber 238 when coupled rear suspension system is compressed. Pull rods 240 and shock absorber 238 function in the same manner discussed above in the first embodiment, however, in this embodiment the lower ends of pull rods 240 and the lower end of shock absorber 238 are mounted in line.

With respect to FIG. 26, link 250 is pivotally coupled on an upper end to bracket 300. Cross shaft 252 is coupled to front control arms 230. Bushing 257 extends through link 250 and receives a fastener 259 to pivotally couple link 250 to front control arms 230. Cross shaft 252 also provides strength and maintains front control arms 230 in a parallel relationship. In this embodiment, lower end of shock absorber 238 is attached to link 250 by way of a C-shaped link 320. Lower end of shock absorber 238 includes a mounting arm 322 having mounting apertures. C-shaped link includes spaced apart C-shaped plates 324, where fasteners 326 may be received therethrough for fastening the C-shaped link to the mounting arm 322. Link 320 has an opening 330 with a pivot opening 332 opposite thereto.

Link 250 is somewhat triangular, and acts as a bell-crank, having a pivot stub shaft 336 at one corner and apertures 338 at another. Opening 330 can "wrap around" stub shaft 336, intermediate links 250 (see FIGS. 2-5) with opening 332 aligned with opening 338. Thus a fastener 340 can be received through opening 338; through sleeve 342 and opening 332, and through the opposite side of the link 250.

Figure 27:
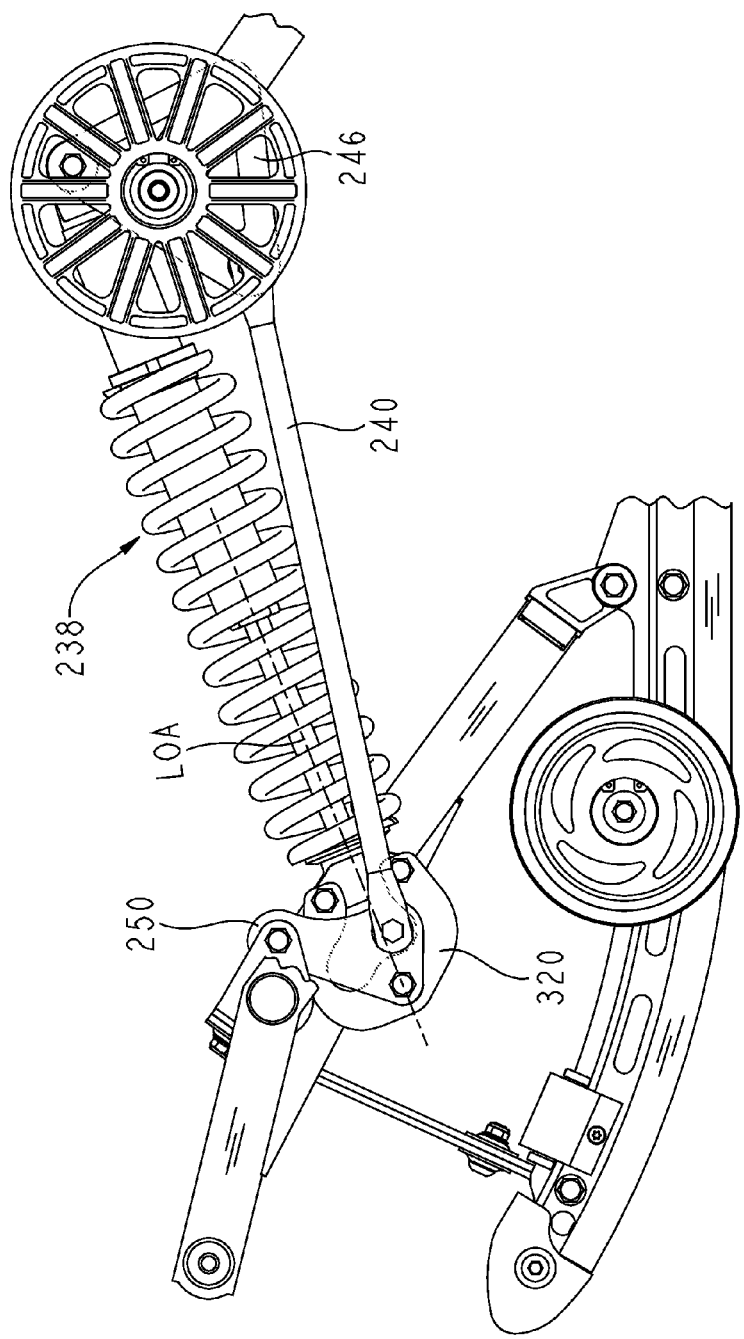
FIG. 27 is a side view of the shock mount assembly of FIG. 25 at full rebound.
Figure 28:
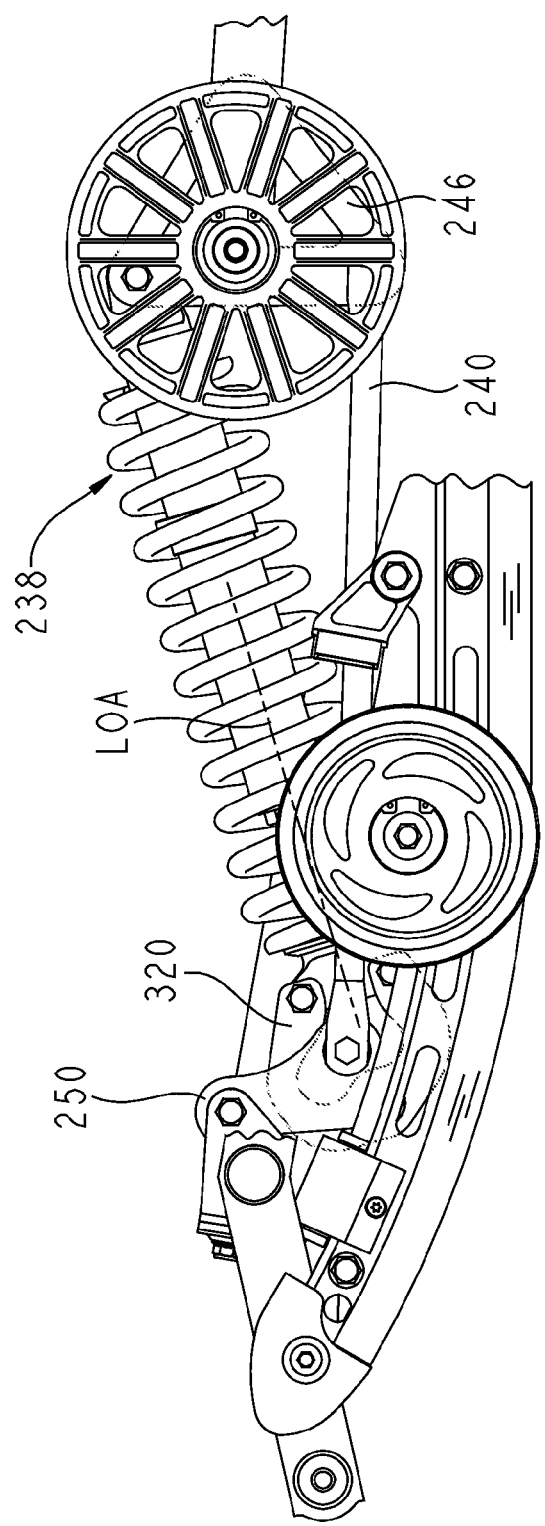
FIG. 28 is a side view similar to that of FIG. 27 at full jounce.

With the above described geometry, a progressive rate suspension is achieved that has the best behaviors of both the coaxial (FIG. 16 embodiment) and an offset design (FIG. 5 embodiment). At full rebound, the system acts similar to a coaxial design because the tension rod pivot is on or near the shock absorber line of action (LOA), as best shown in FIG. 27. As shown, the pivot point of the tension rod 240 (left end as viewed in FIG. 27) is approximately 0.26 inches from the LOA, and would preferably be within 0.75 inches, and more preferably within 0.50 inches. At full jounce, the bell crank, formed by plates 246, rotates so that the tension rod pivot is above the pivot of the shock absorber, as best shown in FIG. 28.

Figure 29:
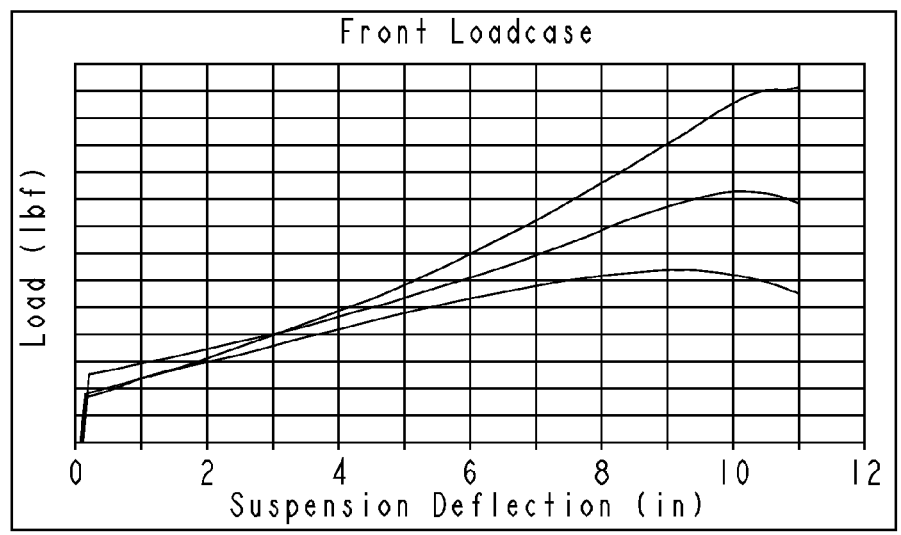
FIG. 29 shows the front load case curve for three comparative suspensions.
Figure 30:
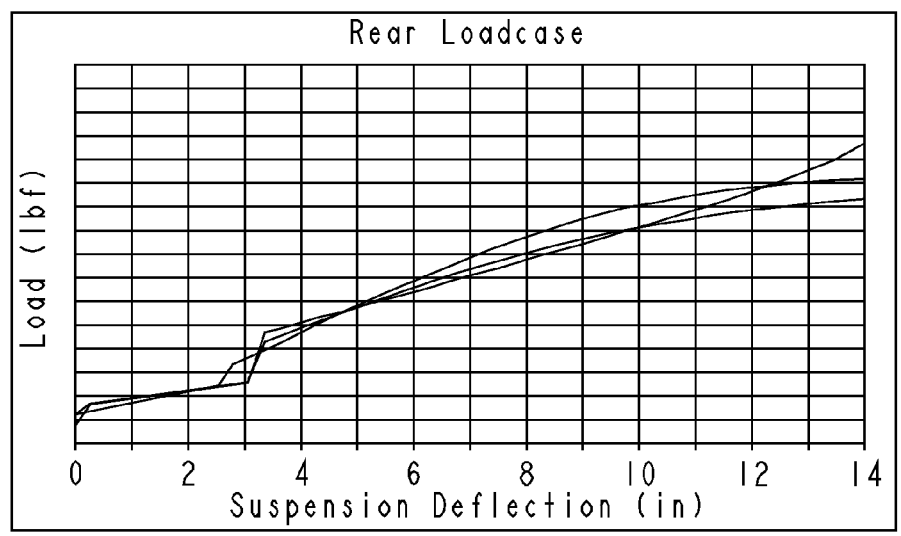
FIG. 30 shows the rear load case curve for three comparative suspensions.

As also shown in the attached curves of FIGS. 29, 30, one can see that the suspension of FIGS. 24-26 is optimized. The front/rear bias is improved by lowering the front rate, but yet the front rate is maintained with the same basic shape. With respect to the rear loadcase, a progressive rate is created.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:
1. A snowmobile having a coupled suspension system, the snowmobile comprising:
  a chassis;
  a lower rail;
  a front control arm defining a first length extending between first and second spaced-apart ends, the front control arm pivotally coupled to the chassis on the first end at a first pivot axis and pivotally coupled to the lower rail on the second end at a second pivot axis;
  a rear control arm pivotally coupled to the chassis at a third pivot axis and pivotally coupled to the lower rail;
  a linkage assembly supported by the front control arm at a position between the first and second ends of the front control arm, the linkage assembly including a coupling link having first and second spaced-apart ends, the second end of the coupling link being operably coupled to the front control arm; and
  a shock absorber and pull rod each including first and second spaced-apart ends, the second ends of the shock absorber and pull rod being operably coupled to the coupling link away from the second end of the coupling link, and the first ends of the shock absorber and pull rod being operably coupled to the rear control arm, the first end of the shock absorber being positioned above the first end of the pull rod, the second end of the shock absorber is pivotally coupled to the coupling link at a fourth pivot axis, and the coupling link is pivotally coupled relative to the front control arm at a fifth pivot axis, wherein:
  a first plane is defined by the first pivot axis and the third pivot axis;
  a second plane is defined by the second pivot axis and the third pivot axis;
  a third plane is defined by the fourth pivot axis and the third pivot axis;
  a fourth plane is defined by the fifth pivot axis and the third pivot axis;
  a first acute angle is formed by the first plane and the second plane, the second pivot axis is below the first plane;
  a second acute angle is formed by the first plane and the third plane, the fourth pivot axis is below the first plane, the second acute angle is less than the first acute angle; and
  a third acute angle is formed by the first plane and the fourth plane, the fifth pivot axis is below the first plane, the third acute angle is less than the second acute angle.

2. The snowmobile of claim 1, wherein the first end of the pull rod is positioned below the first plane.

3. The snowmobile of claim 1, wherein the second end of the pull rod is positioned below the fourth plane.

4. The snowmobile of claim 1, wherein a fifth plane is defined by the first pivot axis and the second pivot axis, the fourth pivot axis is below the fifth plane.

5. The snowmobile of claim 4, wherein the fifth pivot axis is above the fifth plane.

6. The snowmobile of claim 5, wherein the first end of the pull rod is positioned below the first plane, and the second end of the pull rod is positioned below the fourth plane.

7. The snowmobile of claim 6, wherein the pull rod intersects the third plane.

8. The snowmobile of claim 1, wherein a fifth plane is defined by the first pivot axis and the second pivot axis, the fifth pivot axis is above the fifth plane.

9. The snowmobile of claim 8, wherein the shock absorber intersects the third plane.

10. The snowmobile of claim 1, further comprising a second front control arm to define a pair of front control arms, the coupling link is centered between the front control arms.

11. The snowmobile of claim 1, further comprising a second lower rail, the coupling link is centered between the lower rail and the second lower rail.

12. The snowmobile of claim 1, further comprising a second front control arm to define a pair of front control arms, the shock absorber is centered between the front control arms.

13. The snowmobile of claim 1, further comprising a second lower rail, the shock absorber is centered between the lower rail and the second lower rail.

14. The snowmobile of claim 1, further comprising an idler roller coupled to the lower rail and an endless drive belt passing underneath the idler roller, wherein the position the linkage assembly is supported by the front control arm is above the idler roller.

15. The snowmobile of claim 1, wherein the shock absorber includes a rod member operably coupled to a cylinder, the cylinder being operably coupled to the rear control arm and the rod member being operably coupled to the coupling link, the rod member being forward of the cylinder.

16. The snowmobile of claim 1, wherein the pull rod is pivotally coupled to the coupling link at a sixth pivot axis, the sixth pivot axis being spaced apart from the fourth pivot axis and spaced apart from the fifth pivot axis.

17. The snowmobile of claim 1, wherein the rear control arm is pivotally connected to a coupling member which in turn is pivotally connected to the lower rail.

18. A snowmobile having a coupled suspension system, the snowmobile comprising:
   a chassis;
   a lower rail;
   a front control arm defining a first length extending between first and second spaced-apart ends, the front control arm pivotally coupled to the chassis on the first end and pivotally coupled to the lower rail on the second end;
   a rear control arm pivotally coupled to the chassis and lower rail;
   a linkage assembly supported by the front control arm and including a bracket coupled to the front control arm between the first and second spaced-apart ends of the front control arm and a coupling link supported by the bracket and having first and second spaced-apart ends, the second end of the coupling link being pivotally connected to the bracket above the front control arm at a link pivot axis, the link pivot axis being between the first and second spaced-apart ends of the front control arm, the first end of the coupling link is vertically positioned between the first and second spaced-apart ends of the front control arm and extends below the front control arm; and
   a shock absorber and pull rod each including first and second spaced-apart ends, the second ends of the shock absorber and pull rod being operably coupled to the coupling link, the second end of the shock absorber being coupled to the first end of the coupling link extending below the front control arm, and the first ends of the shock absorber and pull rod being operably coupled to the rear control arm with the first end of the shock absorber being positioned above the first end of the pull rod, wherein the second end of the shock absorber is pivotally connected to the first end of the coupling link about a first pivot axis, the first pivot axis is disposed such that the front control arm is disposed between the first pivot axis and the link pivot axis.

19. The snowmobile of claim 18, wherein the first pivot axis is positioned below the front control arm, below the first end of the front control arm, and above the second end of the front control arm.

20. The snowmobile of claim 18, further comprising a second front control arm to define a pair of front control arms, the shock absorber is centered between the front control arms.

21. The snowmobile of claim 18, further comprising a second lower rail, the shock absorber is centered between the lower rail and the second lower rail.

22. The snowmobile of claim 18, further comprising a second front control arm to define a pair of front control arms, the coupling link is centered between the front control arms.

23. The snowmobile of claim 18, further comprising an idler roller coupled to the lower rail and an endless drive belt passing underneath the idler roller, wherein the linkage assembly is supported by the front control arm at a position above the idler roller.

24. The snowmobile of claim 18, wherein the shock absorber includes a rod member operably coupled to a cylinder, the cylinder being operably coupled to the rear control arm and the rod member being operably coupled to the coupling link, the rod member being forward of the cylinder.

25. The snowmobile of claim 18, wherein the second end of the pull rod is pivotally coupled to the coupling link and is spaced apart from the second end of the shock absorber.

26. The snowmobile of claim 18, wherein the rear control arm is pivotally connected to a coupling member which in turn is pivotally connected to the lower rail.

27. A snowmobile having a coupled suspension system, the snowmobile comprising:
   a chassis;
   a lower rail;
   a front control arm defining a first length extending between first and second spaced-apart ends, the front control arm pivotally coupled to the chassis on the first end and pivotally coupled to the lower rail on the second end;
   a rear control arm pivotally coupled to the chassis and lower rail;
   a linkage assembly supported by the front control arm and including a bracket coupled to the front control arm between the first and second spaced-apart ends of the front control arm and a coupling link supported by the bracket and having first and second spaced-apart ends, the second end of the coupling link being pivotally connected to the bracket above the front control arm at a link pivot axis, the link pivot axis being between the first and second spaced-apart ends of the front control arm, the first end of the coupling link is vertically positioned between the first and second spaced-apart ends of the front control arm and extends below the front control arm; and
   a shock absorber and pull rod each including first and second spaced-apart ends, the second ends of the shock absorber and pull rod being operably coupled to the coupling link, the second end of the shock absorber being coupled to the first end of the coupling link extending below the front control arm, and the first ends of the shock absorber and pull rod being operably coupled to the rear control arm with the first end of the shock absorber being positioned above the first end of the pull rod, wherein the second end of the shock absorber is pivotally connected to the first end of the coupling link about a first pivot axis, the first pivot axis is positioned below the front control arm, below the first end of the front control arm, and above the second end of the front control arm and wherein the second end of the pull rod is pivotally connected to the coupling link between the first end of the coupling link and the second end of the coupling link.

28. The snowmobile of claim 27, wherein the rear control arm is pivotally connected to a coupling member which in turn is pivotally connected to the lower rail.

29. A snowmobile having a coupled suspension system, the snowmobile comprising:
- a chassis;
- a lower rail;
- an endless drive belt, the lower rail positioned within an interior of the endless drive belt;
- an idler roller coupled to the lower rail and contacting the endless drive belt;
- a front control arm defining a first length extending between first and second spaced-apart ends, the front control arm pivotally coupled to the chassis on the first end and pivotally coupled to the lower rail on the second end;
- a rear control arm pivotally coupled to the chassis and lower rail;
- a linkage assembly supported by the front control arm and including
  - a bracket coupled to the front control arm, and
  - a coupling link having first and second spaced-apart ends, the second end of the coupling link being pivotally connected to the bracket at a link pivot axis vertically positioned between the first and second spaced-apart ends of the front control arm, above the idler roller and below the chassis;
- a shock absorber including first and second spaced-apart ends, the second end of the shock absorber being pivotally coupled to the coupling link at a first pivot axis; and
- a pull rod including first and second spaced-apart ends, the second end of the pull rod being pivotally coupled to the coupling link at a second pivot axis, the second pivot axis being vertically positioned between the first and second spaced-apart ends of the front control arm, above the idler roller and below the chassis, the second pivot axis being spaced-apart from the link pivot axis, spaced-apart from the first pivot axis, positioned between the link pivot axis and the first pivot axis, and positioned between the idler roller and the link pivot axis, wherein the first ends of the shock absorber and pull rod are operably coupled to the rear control arm with the first end of the shock absorber being positioned above the first end of the pull rod.

30. The snowmobile of claim 29, wherein the rear control arm is pivotally connected to a coupling member which in turn is pivotally connected to the lower rail.

* * * * *